(12) United States Patent
Gagnon et al.

(10) Patent No.: US 12,473,866 B2
(45) Date of Patent: Nov. 18, 2025

(54) INTEGRATED THROTTLE—FUEL MIXER

(71) Applicant: Generac Power Systems, Inc., Waukesha, WI (US)

(72) Inventors: Nathan Gagnon, Delafield, WI (US); Jesse Dees, West Bend, WI (US); Anthony Petcoff, West Allis, WI (US); Pauras Sawant, Waukesha, WI (US); Daniel Sherwin, Milwaukee, WI (US); Tim Bembenek, Pewaukee, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 148 days.

(21) Appl. No.: 18/100,488

(22) Filed: Jan. 23, 2023

(65) Prior Publication Data
US 2023/0235706 A1    Jul. 27, 2023

Related U.S. Application Data

(60) Provisional application No. 63/302,294, filed on Jan. 24, 2022.

(51) Int. Cl.
*F02D 19/00*    (2006.01)
*B01F 23/213*   (2022.01)
(Continued)

(52) U.S. Cl.
CPC ........ *F02D 19/023* (2013.01); *B01F 23/2132* (2022.01); *B01F 25/312511* (2022.01);
(Continued)

(58) Field of Classification Search
CPC .......... B01F 25/312531; B01F 35/2113; B01F 35/2115; B01F 35/718051; F02B 63/042;
(Continued)

(56) References Cited

U.S. PATENT DOCUMENTS 4,152,121 A * 5/1979 Van Der Weide ... F02M 21/047
                                                      123/527
4,159,701 A * 7/1979 Murata .................... F02M 3/02
                                                   123/DIG. 11
(Continued)

FOREIGN PATENT DOCUMENTS

EP    2055917 A1    5/2009
JP    H08246960 A   9/1996
(Continued)

OTHER PUBLICATIONS

PCT International Searching Authority; The International Search Report and Written Opinion for application No. PCT/US2023/061116 mailed May 2, 2023; 61 pages.

*Primary Examiner* — Phutthiwat Wongwian
*Assistant Examiner* — Sherman D Manley
(74) *Attorney, Agent, or Firm* — Merchant & Gould P.C.

(57) ABSTRACT

A fuel delivery arrangement for a generator can include a throttle-mixing assembly including a mixer body defining a main port extending between an air inlet end and a mixed air-fuel outlet end and defining a fuel inlet port extending into the main port, a Venturi structure located within the main port and being configured to mix fuel received from the fuel inlet port with air received from the air inlet end and to deliver an air-fuel mixture to the air-fuel outlet, a fuel control valve assembly, mounted to the mixer body, including a first valve and a first actuator arranged to control a flow of the fuel passing through the fuel inlet port, and a throttle control valve assembly, mounted to the mixer body, including a second valve and a second actuator arranged to control a flow of the air-fuel mixture passing through the main port.

19 Claims, 28 Drawing Sheets

(51) Int. Cl.
- *B01F 25/312* (2022.01)
- *B01F 35/21* (2022.01)
- *B01F 35/71* (2022.01)
- *F02B 63/04* (2006.01)
- *F02D 19/02* (2006.01)
- *F02M 21/02* (2006.01)
- *F02M 21/04* (2006.01)
- *H02K 7/18* (2006.01)

(52) U.S. Cl.
CPC .. *B01F 25/312531* (2022.01); *B01F 35/2113* (2022.01); *B01F 35/2115* (2022.01); *B01F 35/718051* (2022.01); *F02B 63/042* (2013.01); *F02D 19/027* (2013.01); *F02M 21/0233* (2013.01); *F02M 21/047* (2013.01); *H02K 7/1815* (2013.01); *F02M 2700/123* (2013.01)

(58) Field of Classification Search
CPC ............ F02B 63/044; F02D 19/027; F02D 2200/0406; F02D 2200/0414; F02D 2400/06; F02M 21/0233; F02M 21/047; F02M 21/023; F02M 2700/123
See application file for complete search history.

(56) References Cited

U.S. PATENT DOCUMENTS

| | | | |
|---|---|---|---|
| 4,434,772 A * | 3/1984 | Hartel | F02M 19/088 123/549 |
| 4,635,609 A * | 1/1987 | Seppen | F02M 26/19 123/527 |
| 4,909,214 A * | 3/1990 | Shirakawa | F02D 11/107 123/399 |
| 5,297,522 A * | 3/1994 | Buchl | F02D 11/107 123/399 |
| 6,267,099 B1 * | 7/2001 | Yamada | F02D 9/1065 123/406.47 |
| 6,497,245 B1 * | 12/2002 | Torii | F02D 9/10 137/454.6 |
| 7,201,159 B2 * | 4/2007 | Veinotte | F16K 11/052 123/568.17 |
| 8,005,603 B2 * | 8/2011 | Fisher | F02D 19/023 123/527 |
| 11,073,122 B2 * | 7/2021 | Burns | F02M 69/044 |
| 2002/0050268 A1 * | 5/2002 | Deguchi | F02D 11/04 123/336 |
| 2003/0089870 A1 * | 5/2003 | Borasch | F02D 11/10 251/129.11 |
| 2004/0139951 A1 * | 7/2004 | Fisher | F02D 41/1454 123/527 |
| 2005/0045148 A1 * | 3/2005 | Katsuragawa | F02D 11/10 123/399 |
| 2009/0088950 A1 * | 4/2009 | Fisher | F02M 21/047 261/78.1 |
| 2009/0301569 A1 * | 12/2009 | Akiyama | F02M 35/10216 137/115.01 |
| 2010/0139617 A1 * | 6/2010 | Akiyama | F02D 9/1055 123/337 |
| 2010/0242937 A1 * | 9/2010 | Baldauf | F02D 19/023 123/704 |
| 2010/0256890 A1 * | 10/2010 | Baldauf | F02D 41/18 701/102 |
| 2011/0041800 A1 * | 2/2011 | Wong | F02D 41/2474 123/319 |
| 2014/0111193 A1 * | 4/2014 | Mizunuma | G01D 3/028 324/207.25 |
| 2014/0261311 A1 * | 9/2014 | Bayer | F02M 21/023 123/336 |
| 2016/0186677 A1 * | 6/2016 | Achiwa | F02M 37/04 440/88 A |
| 2017/0241425 A1 | 8/2017 | Frampton et al. | |
| 2018/0119656 A1 * | 5/2018 | Shehan | F02D 9/02 |
| 2019/0120193 A1 * | 4/2019 | Burns | F02M 69/044 |
| 2021/0404428 A1 | 12/2021 | Zuehl et al. | |
| 2022/0090547 A1 * | 3/2022 | Bykowski | F02D 11/107 |
| 2023/0068586 A1 * | 3/2023 | Matsukawa | F02M 21/0221 |

FOREIGN PATENT DOCUMENTS

| | | |
|---|---|---|
| JP | H08319860 A | 12/1996 |
| JP | 2003214260 A | 7/2003 |
| WO | 2019169201 A1 | 9/2019 |

* cited by examiner

INTEGRATED THROTTLE—FUEL MIXER

RELATED APPLICATION

This application claims priority to U.S. Provisional Patent Application Ser. No. 63/302,294, filed on Jan. 24, 2022, the entirety of which is incorporated by reference herein.

BACKGROUND

In gaseous-fueled engines, for example engines used in electric generator applications, fuel and intake air are mixed at a mixer delivered to cylinders for combustion. In a typical system, fuel is first regulated with variable orifices controlled by diaphragms using engine vacuum. This fuel is then routed to a fuel and air mixer by hoses which is then metered by fixed orifices provided on the mixer. Two mechanically linked throttles, separate from the mixer, control the fuel and air mixture based on load control, for example based on signals to an actuator. Improvements are desired.

SUMMARY

The present disclosure relates generally to gaseous-fueled generators. In one possible configuration, and by non-limiting example, an electronically controlled throttle with an integrated air-fuel mixer is disclosed. The disclosed integrated design advantageously reduces the number mechanical parts, reduces the overall footprint of the air-fuel delivery system, reduces the number of leak points, increases adaptability for different applications and operating environments, and can electrically compensate for load, fuel pressure, intake pressure, and combustion. In some advantageous arrangements, a single device is provided with the ability to electronically meter low pressure (3½ to 14 in-H2O) gaseous fuel with an electronically controlled valve, draw the fuel through the device by a Venturi, and then mix the fuel with air that is then metered by an electronically controlled valve.

A fuel delivery arrangement for a generator can include a throttle-mixing assembly including a mixer body defining a main port extending between an air inlet end and a mixed air-fuel outlet end and defining a fuel inlet port extending into the main port, a Venturi structure located within the main port and being configured to mix fuel received from the fuel inlet port with air received from the air inlet end and to deliver an air-fuel mixture to the air-fuel outlet, a fuel control valve assembly, mounted to the mixer body, including a first valve and a first actuator arranged to control a flow of the fuel passing through the fuel inlet port, and a throttle control valve assembly, mounted to the mixer body, including a second valve and a second actuator arranged to control a flow of the air-fuel mixture passing through the main port.

In some examples, the first valve is a throttle plate located within the fuel inlet port.

In some examples, the second valve is a throttle plate located within the main port downstream of the Venturi structure.

In some examples, the first actuator and the second actuator are electric motorized actuators.

In some examples, the arrangement further includes an electrical wiring harness, mounted to the mixer body, the wiring harness being in electrical connection with the first actuator and the second actuator.

In some examples, the arrangement further includes one or more of a first pressure sensor for sensing fuel pressure proximate the fuel inlet port, a second pressure sensor for sensing air-fuel mixture pressure, a temperature sensor proximate the air-fuel outlet port, a first position sensor for sensing a position of the first valve, and a second position sensor for sensing a position of the second valve.

In some examples, the arrangement further includes an electrical wiring harness, mounted to the mixer body, the wiring harness being in electrical connection with the first actuator and the second actuator and in electrical connection with the one or more of the first pressure sensor, second pressure sensor, temperature sensor, first position sensor, and second position sensor.

In some examples, the second pressure sensor, temperature sensor, and second position sensor are provided in a common housing.

In some examples, the temperature sensor includes a probe extending into the main port.

In some examples, the arrangement further includes one or both of a first and second position sensor, the first position sensor for sensing a position of the first valve, the first position sensor being mounted to the mixer body on a side opposite the first actuator, the second position sensor for sensing a position of the second valve, the second position sensor being mounted to the mixer body on a side opposite the second actuator.

In some examples, the first valve includes a first valve member and a first shaft, wherein the first actuator is connected to a first end of the first shaft and the first position sensor is connected to a second end of the first shaft, wherein the second valve includes a second valve member and a second shaft, wherein the second actuator is connected to a first end of the second shaft and the second position sensor is connected to a second end of the second shaft.

A generator assembly can include an internal combustion engine, an electric generator coupled to and driven by the engine, and a fuel delivery arrangement for delivering an air-fuel mixture to the internal combustion engine. The fuel delivery arrangement comprising a throttle-mixing assembly including a mixer body defining a main port extending between an air inlet end and a mixed air-fuel outlet end and defining a fuel inlet port extending into the main port, a Venturi structure located within the main port and being configured to mix fuel received from the fuel inlet port with air received from the air inlet end and to deliver an air-fuel mixture to the air-fuel outlet, a fuel control valve assembly, mounted to the mixer body, including a first valve and a first actuator arranged to control a flow of the fuel passing through the fuel inlet port, a throttle control valve assembly, mounted to the mixer body, including a second valve and a second actuator arranged to control a flow of the air-fuel mixture passing through the main port.

In some examples of the generator assembly, the first valve is a throttle plate located within the fuel inlet port.

In some examples of the generator assembly, the second valve is a throttle plate located within the main port downstream of the Venturi structure.

In some examples of the generator assembly, the first actuator and the second actuator are electric motorized actuators.

In some examples, the generator assembly further includes an electrical wiring harness, mounted to the mixer body, the wiring harness being in electrical connection with the first actuator and the second actuator.

In some examples, the generator assembly further includes one or more of a first pressure sensor for sensing fuel pressure proximate the fuel inlet port, a second pressure sensor for sensing air-fuel mixture pressure, a temperature sensor proximate the air-fuel outlet port, a first position sensor for sensing a position of the first valve, and a second position sensor for sensing a position of the second valve.

In some examples, the generator assembly further includes an electrical wiring harness, mounted to the mixer body, the wiring harness being in electrical connection with the first actuator and the second actuator and in electrical connection with the one or more of the first pressure sensor, second pressure sensor, temperature sensor, first position sensor, and second position sensor.

In some examples of the generator assembly, the second pressure sensor, temperature sensor, and second position sensor are provided in a common housing.

In some examples of the generator assembly, the temperature sensor includes a probe extending into the main port.

In some examples, the generator assembly further includes one or both of a first and second position sensor, the first position sensor for sensing a position of the first valve, the first position sensor being mounted to the mixer body on a side opposite the first actuator, the second position sensor for sensing a position of the second valve, the second position sensor being mounted to the mixer body on a side opposite the second actuator.

In some examples of the generator assembly, the first valve includes a first valve member and a first shaft, wherein the first actuator is connected to a first end of the first shaft and the first position sensor is connected to a second end of the first shaft, wherein the second valve includes a second valve member and a second shaft, wherein the second actuator is connected to a first end of the second shaft and the second position sensor is connected to a second end of the second shaft.

In some examples, the generator assembly further includes an electronic controller for controlling the first and second actuators.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

Corresponding reference characters indicate corresponding parts throughout the several views. The exemplifications set out herein illustrate an embodiment of the invention, and such exemplifications are not to be construed as limiting the scope of the invention in any manner.

DETAILED DESCRIPTION

Figure 1:
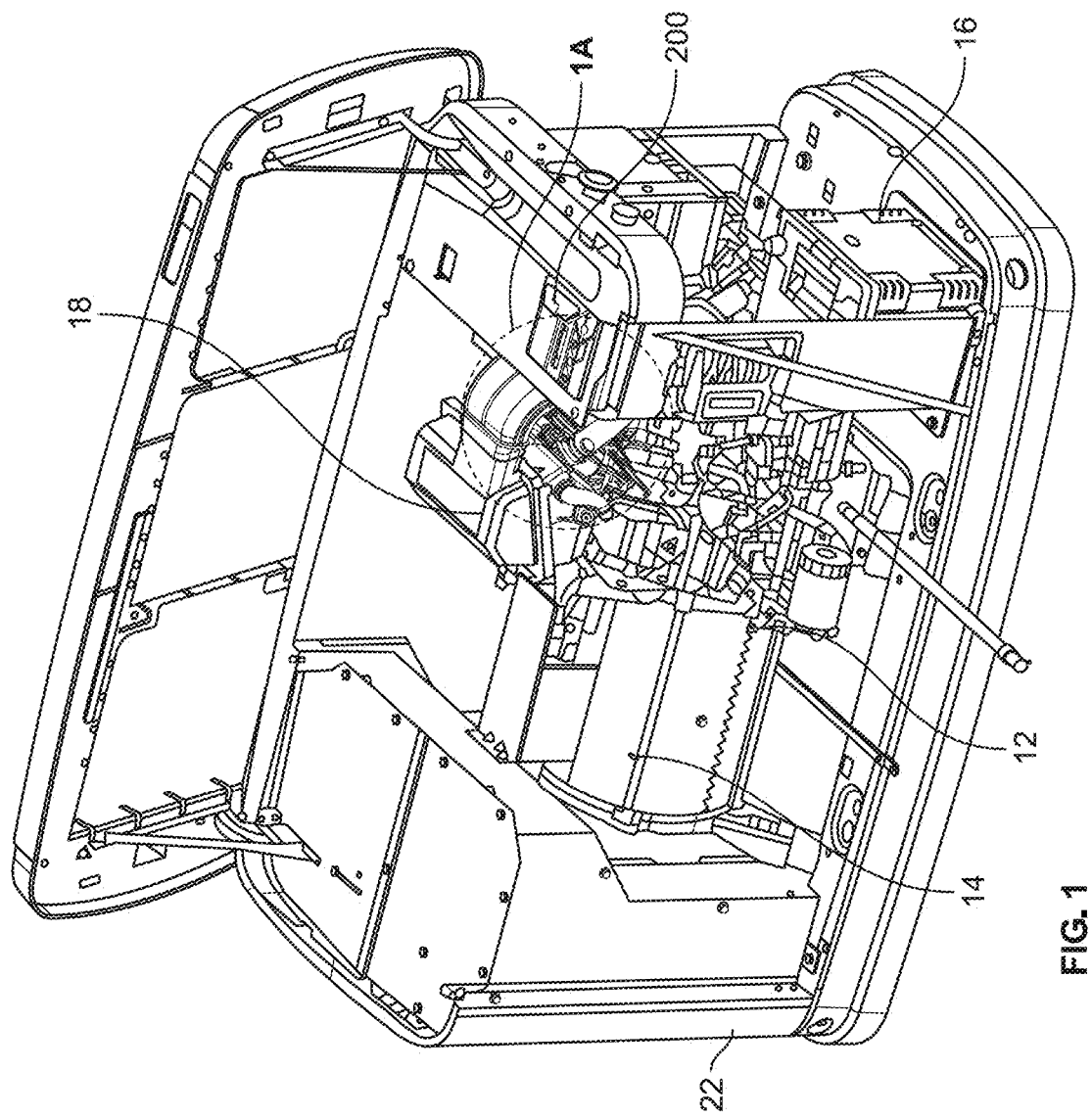
FIG. 1 is a perspective view of an electric generator having features in accordance with the present disclosure.
Figure 1A:
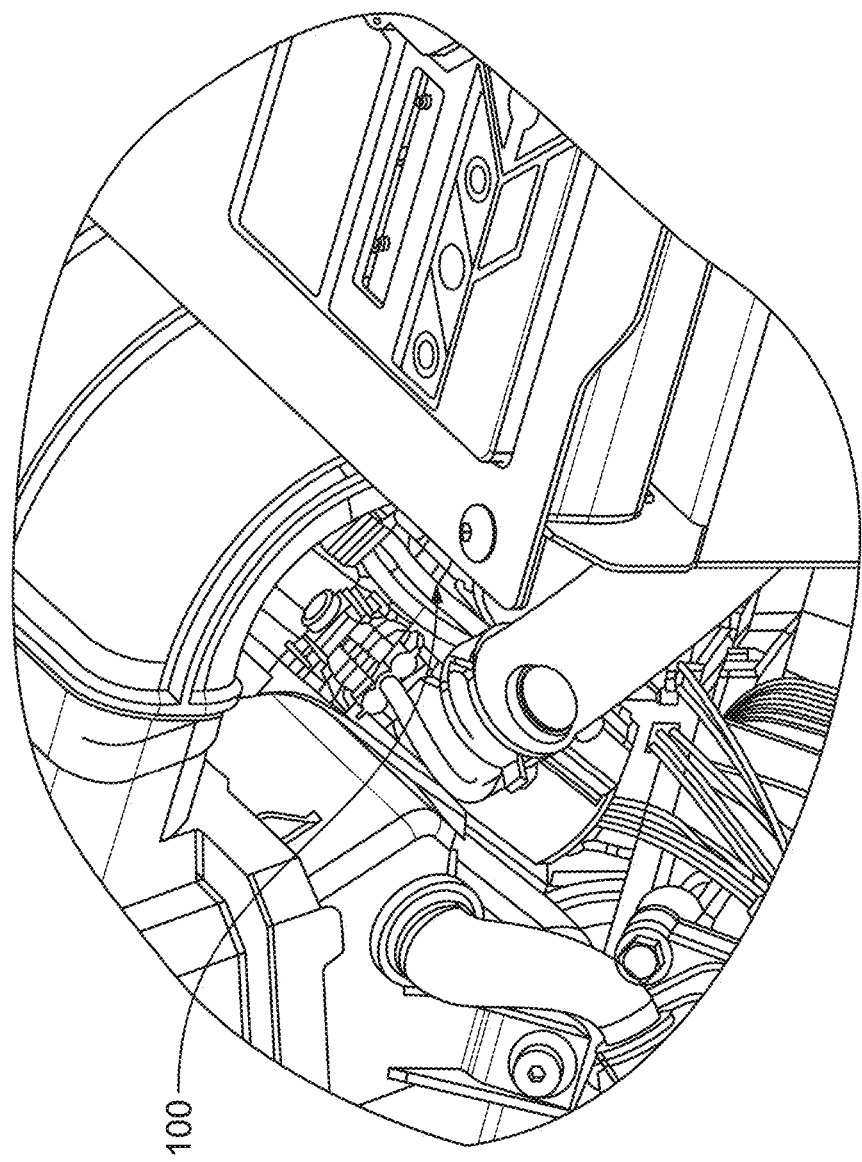
FIG. 1A is a partial perspective view of the electric generator shown in FIG. 1.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 2:
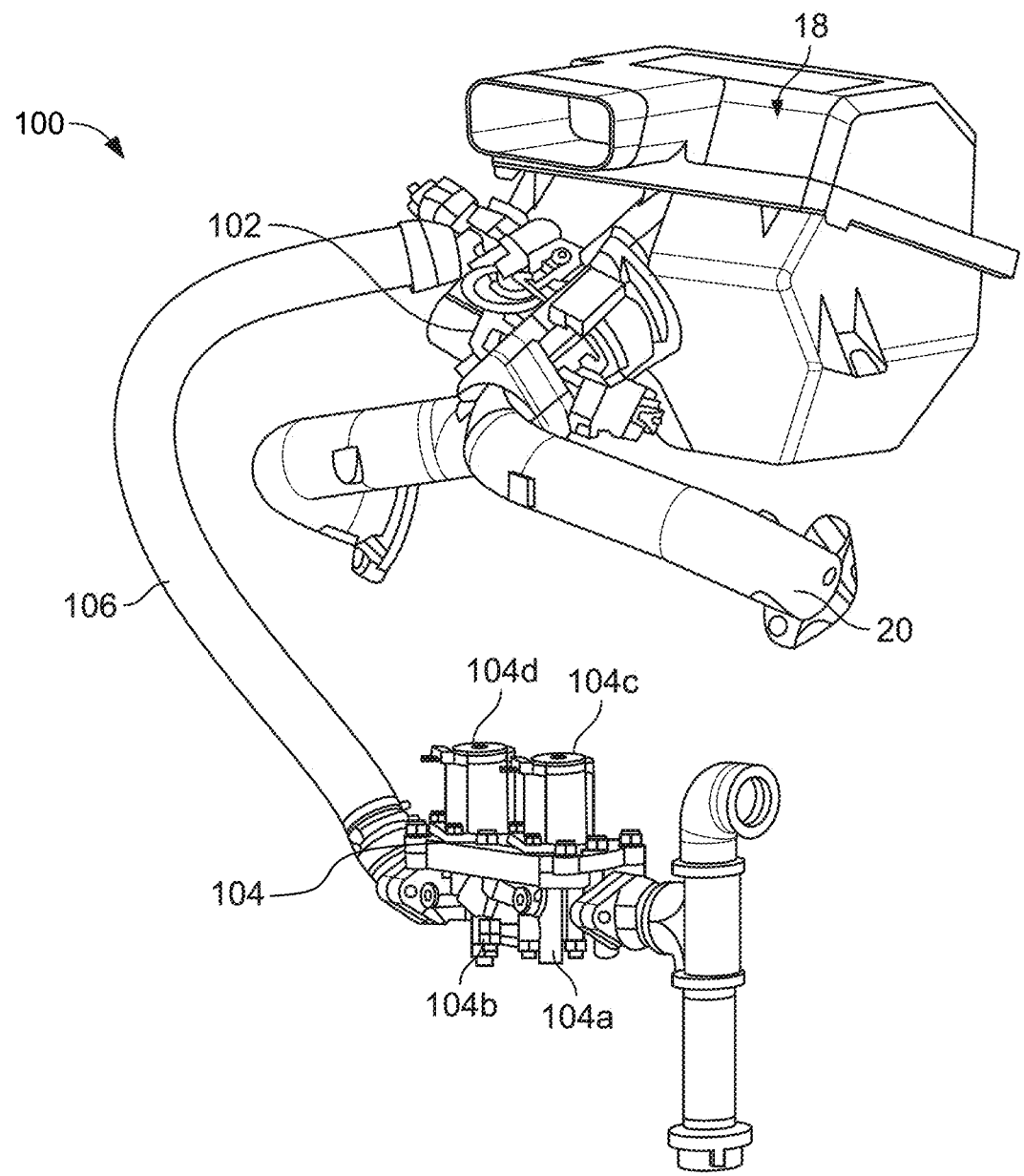
FIG. 2 is a perspective view of a fuel delivery system of the generator shown in FIG. 1.
Figure 3:
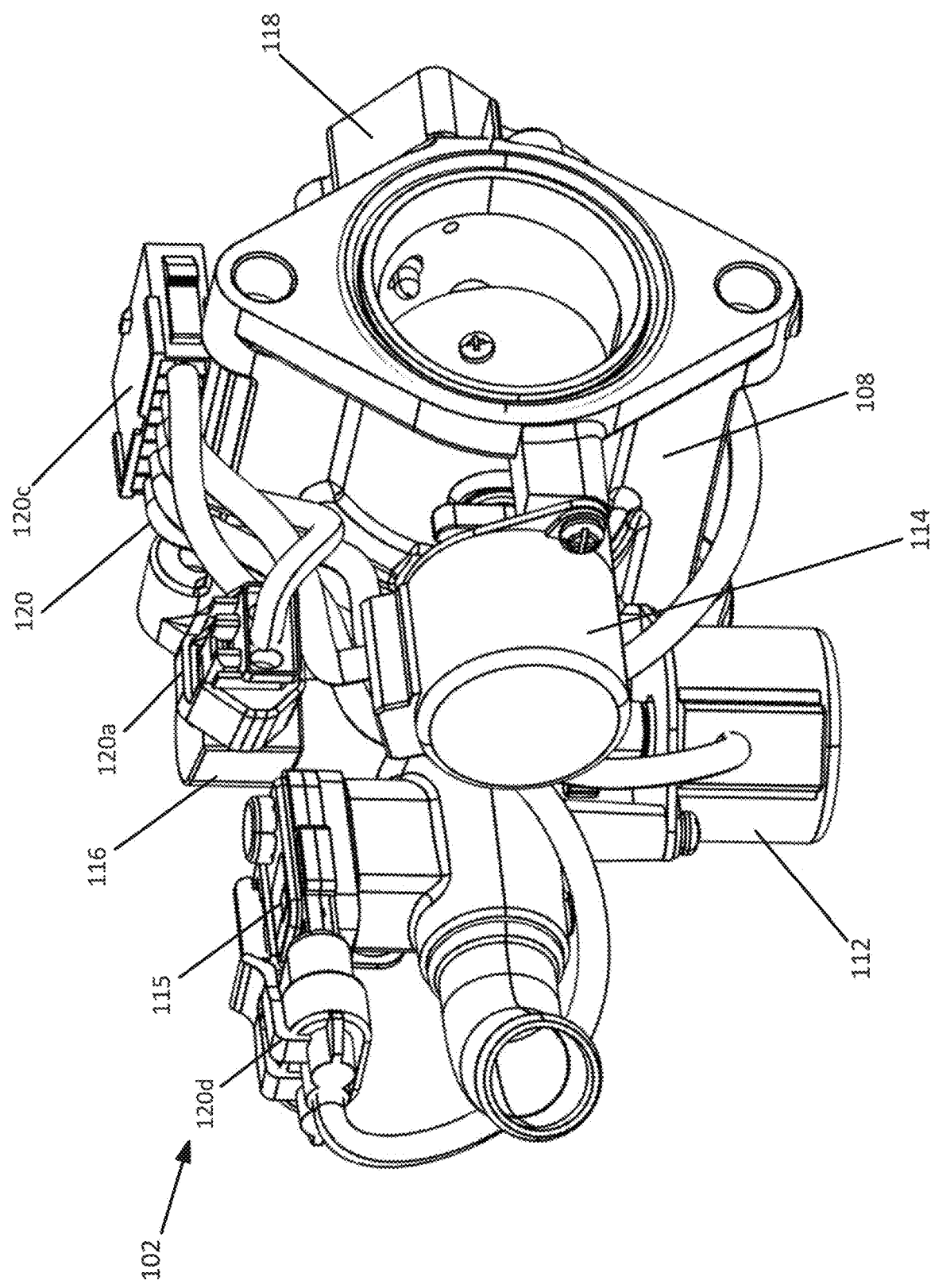
FIG. 3 is a perspective view of a throttle-mixing assembly of the fuel delivery shown in FIG. 2.
Figure 4:
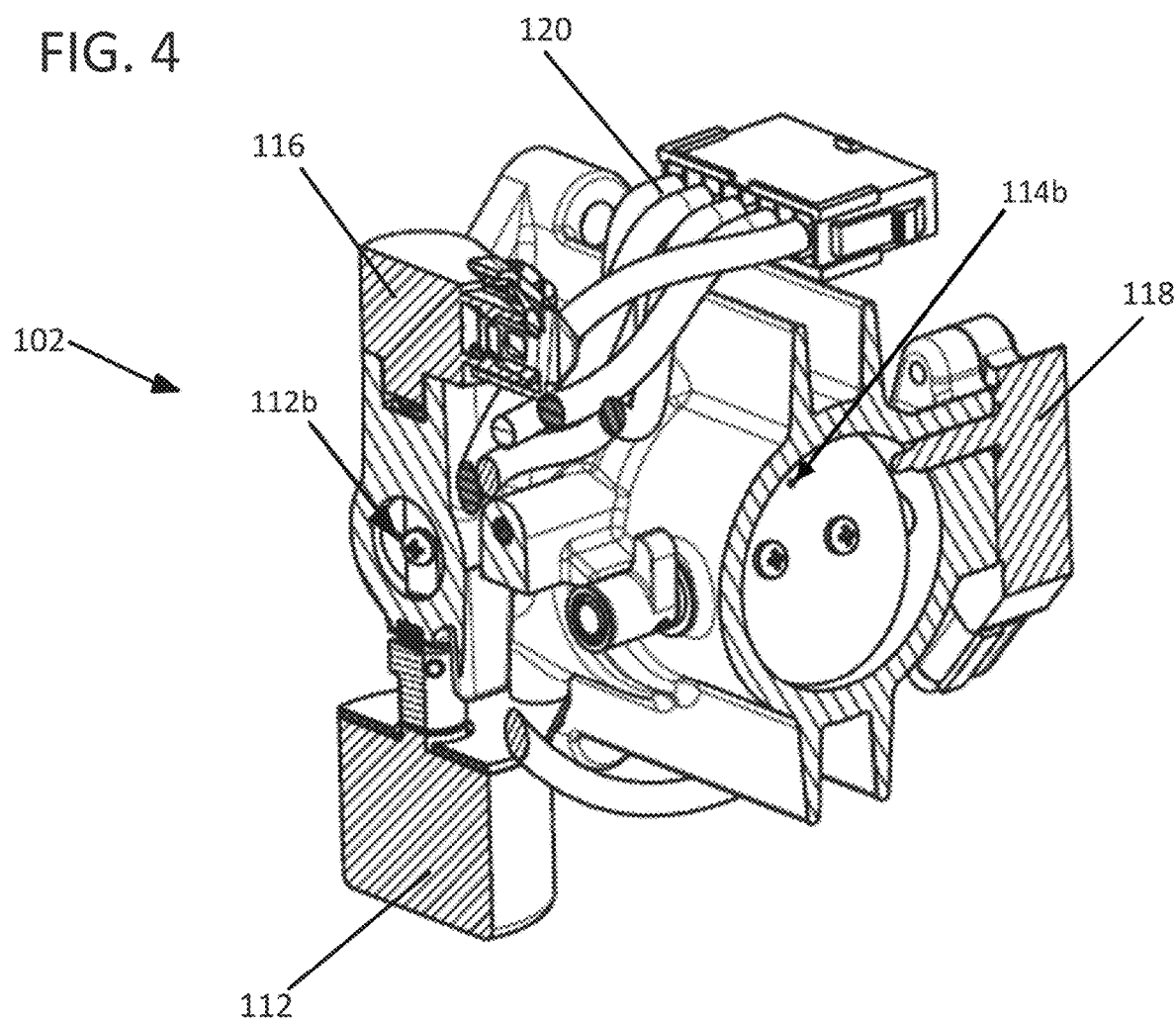
FIG. 4 is a perspective cutaway view of a throttle-mixing assembly shown in FIG. 3.
Figure 5:
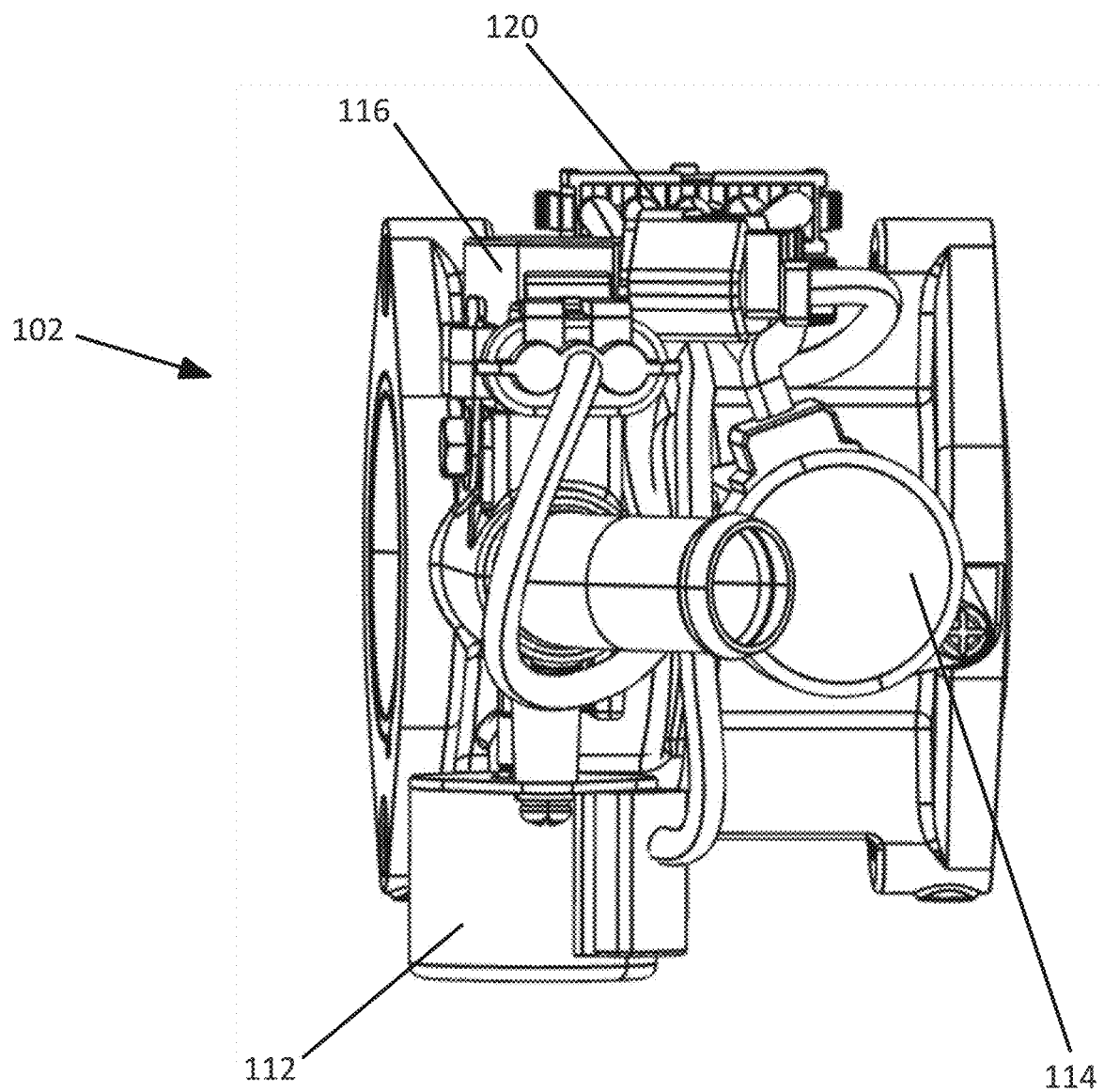
FIG. 5 is a first side view of the throttle-mixing system shown in FIG. 3.
Figure 6:
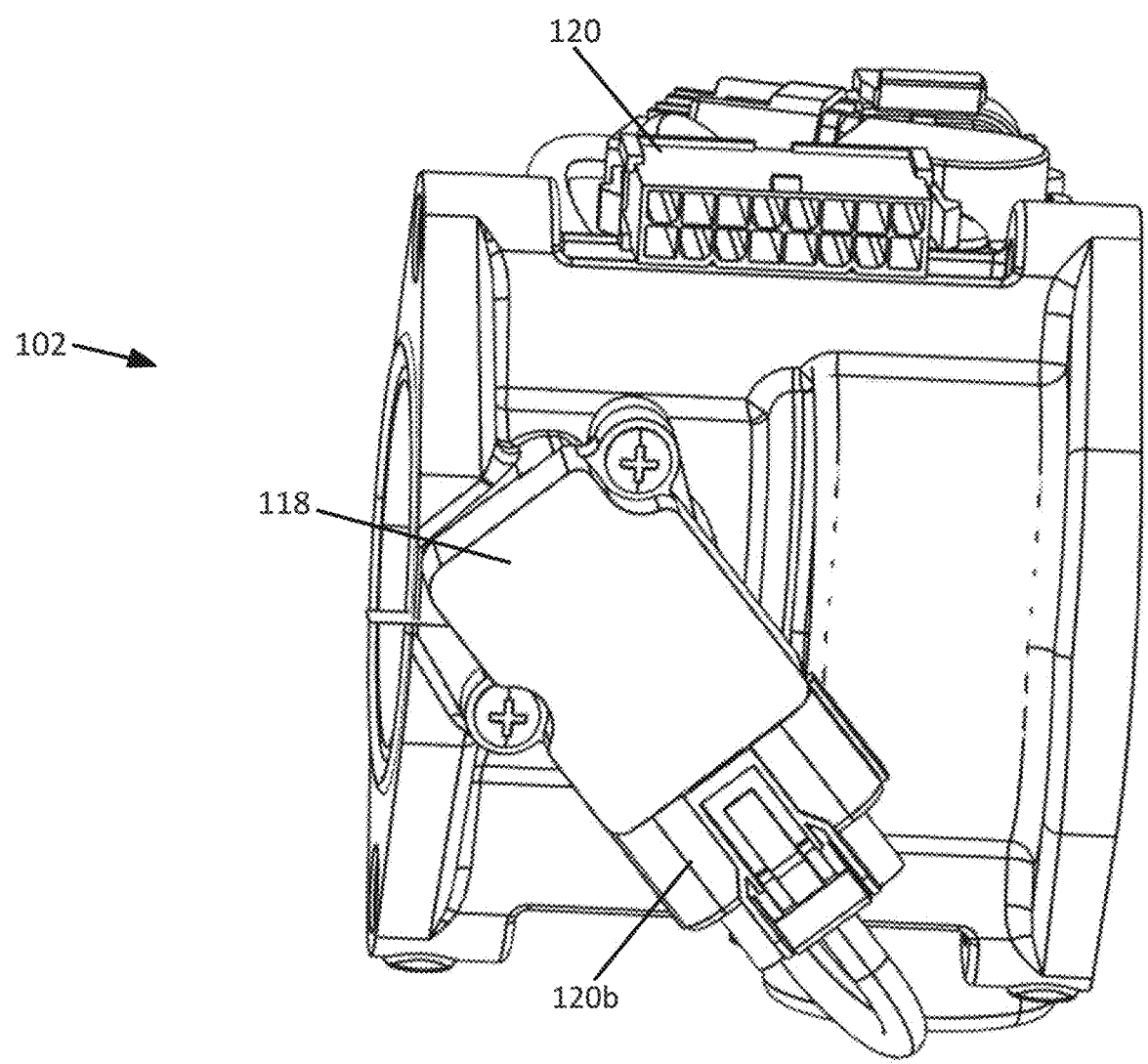
FIG. 6 is a second side view of the throttle-mixing system shown in FIG. 3.
Figure 7:
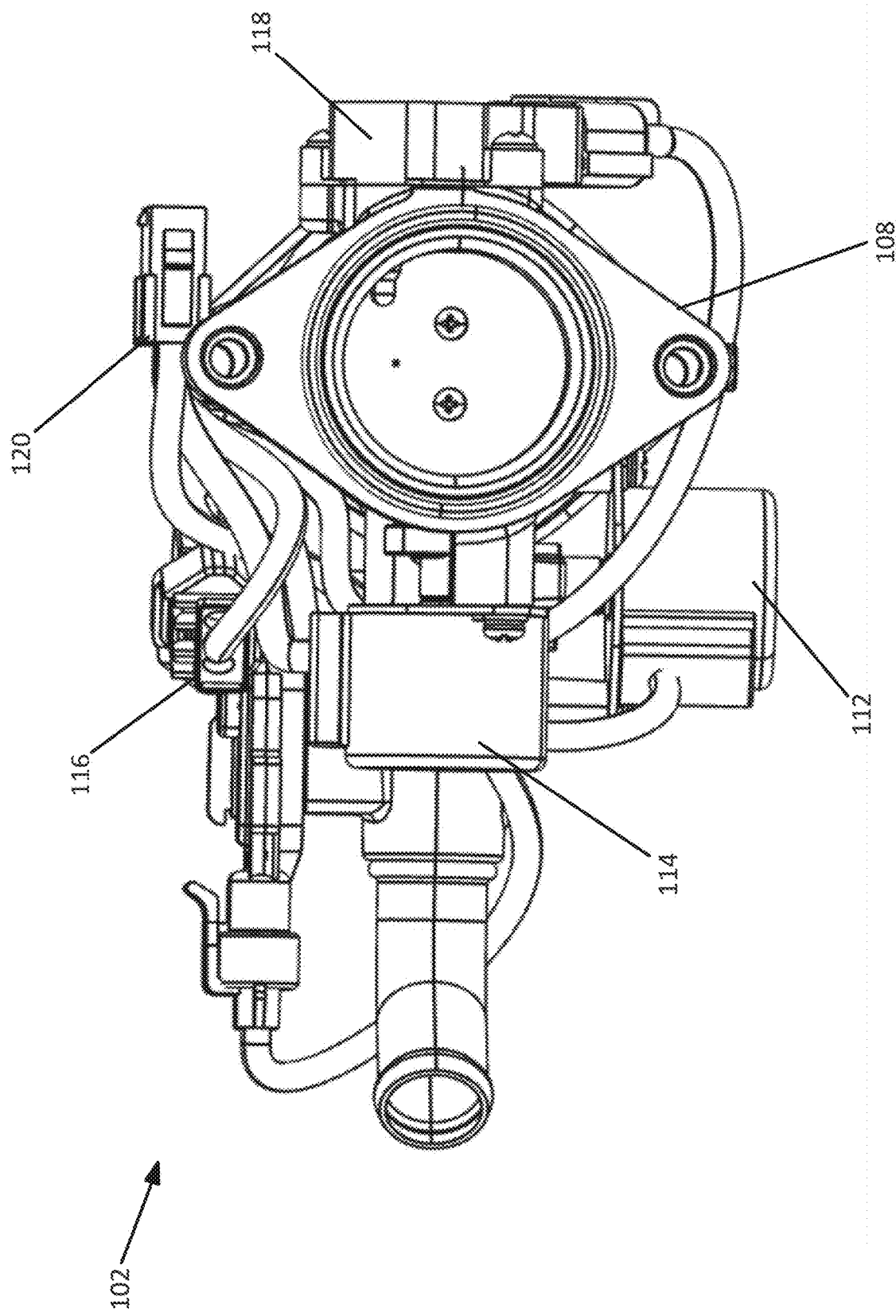
FIG. 7 is a first end view of the throttle-mixing system shown in FIG. 3.
Figure 8:
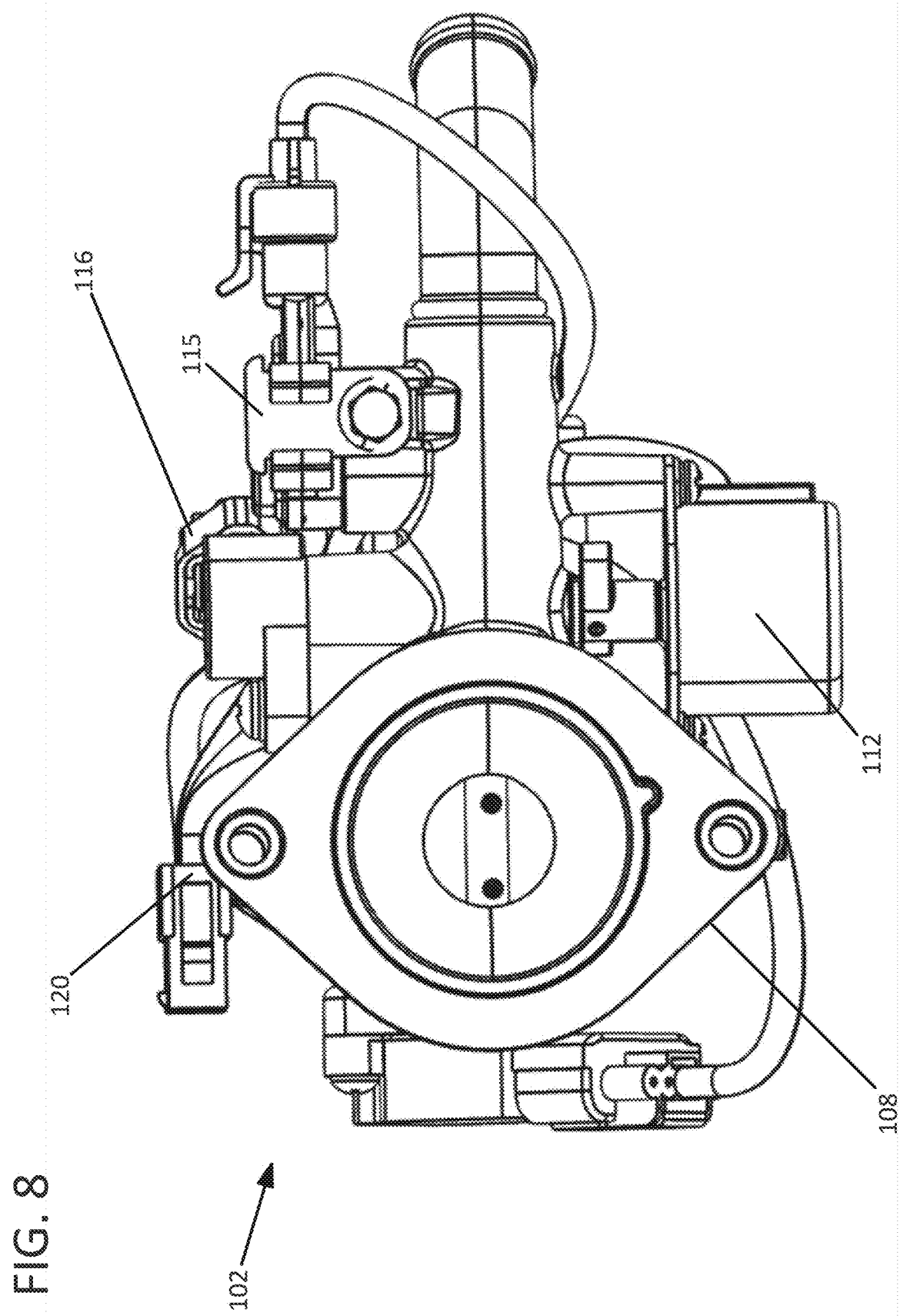
FIG. 8 is a second end view of the throttle-mixing system shown in FIG. 3.
Figure 9:
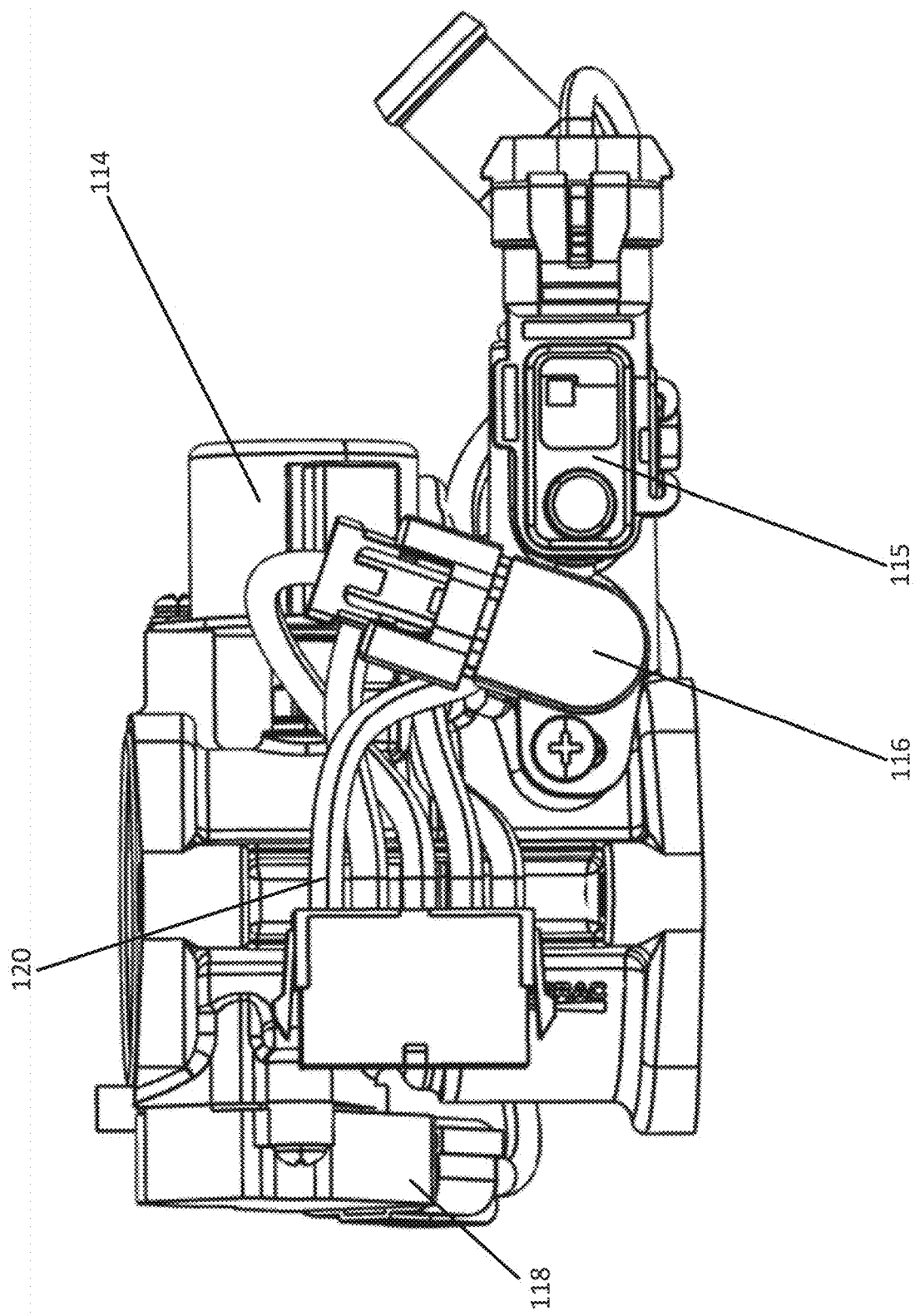
FIG. 9 is a top view of the throttle-mixing system shown in FIG. 3.
Figure 10:
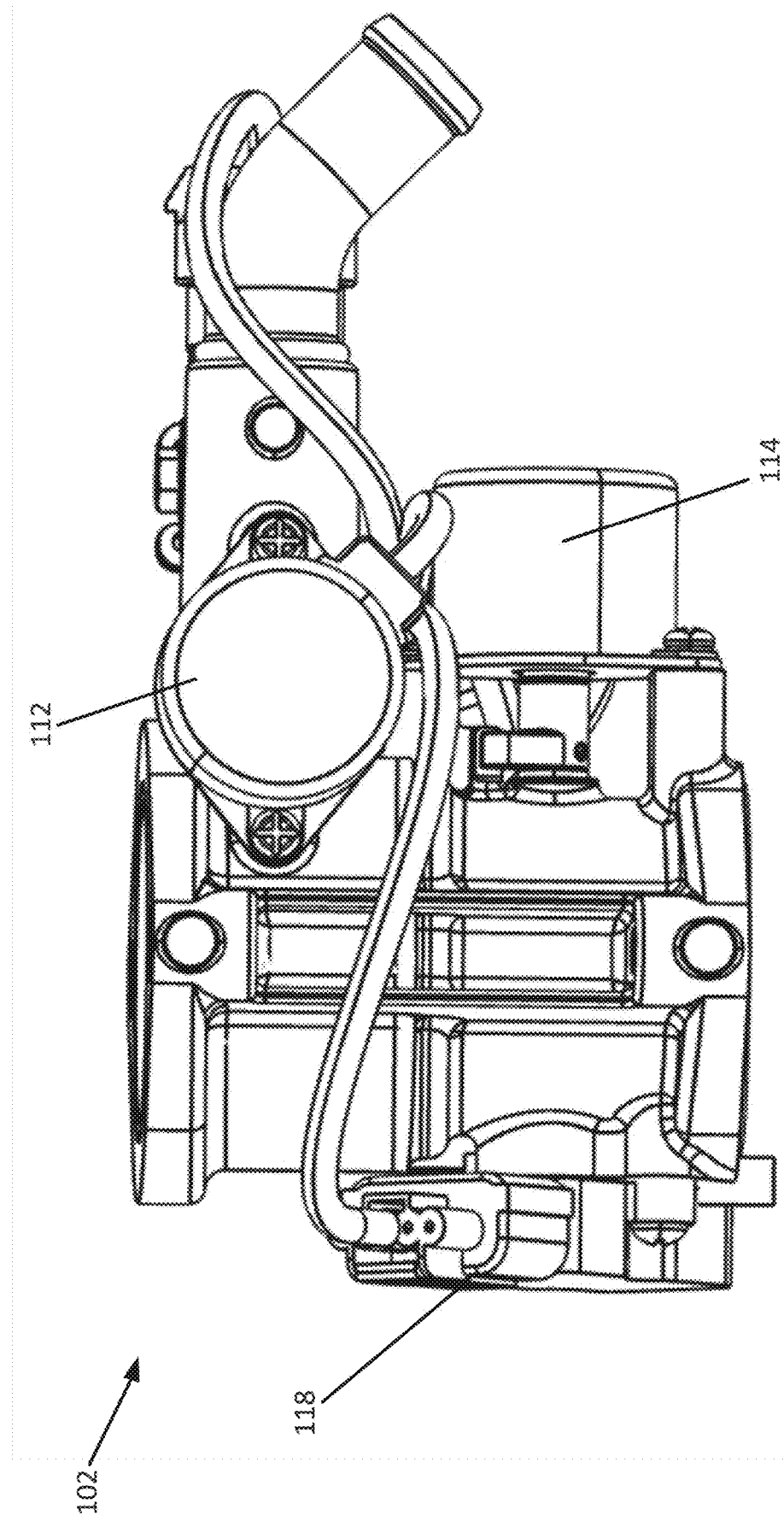
FIG. 10 is a bottom view of the throttle-mixing system shown in FIG. 3.

Referring to FIGS. 1-3, an electric generator 10 is presented. The electric generator 10 is shown as including an internal combustion engine 12, an electric generator 14 coupled to and driven by the engine 12, and a battery 16 for starting the engine 12. The electric generator 10 is further shown as including an air-fuel delivery arrangement 100 for throttling fuel and for forming an air-fuel mixture for delivery to the internal combustion engine 12. Example fuels usable with electric generator 10 and air-fuel delivery arrangement 100 are liquid propane and natural gas. The air-fuel delivery arrangement 100 is connected, at an inlet, to an air intake airbox 18 and is further connected, at an outlet, to an intake manifold 20 which is in turn connected to the internal combustion engine 12. The electric generator 10 is additionally shown as including an electronic controller 200 for controlling the air-fuel delivery arrangement 100 in addition to the internal combustion engine 12 and generator 14. In the example shown, the electric generator 10 is mounted within a protective enclosure 22. The protective enclosure 22 shown in FIG. 1 fully encloses the electric generator 10 and is provide with an access door, but is shown with a front and side panel removed for illustrative purposes.

With reference to FIG. 2, the air-fuel delivery arrangement 100 is shown as including a throttle-mixing assembly 102 and a fuel shut-off assembly 104 that are interconnected by a fuel line or hose 106. As shown, the fuel shut-off assembly 104 is configured as a dual fuel shut-off valve including a first shut-off valve 104a and a second shut-off valve 104b in series with the first valve 104a. Each of the valves 104a, 104b is actuated by a solenoid or motor 104c, 104d that can be connected, for example, to the electronic controller 200 and/or safety devices. The fuel shut-off assembly 104 is a safety device that can be operated to block fuel flow to throttle-mixing assembly 102 and therefore the engine 12 under certain conditions.

With reference to FIGS. 3 to 10, the throttle-mixing assembly 102 is shown in further detail. In one aspect, the throttle-mixing assembly 102 includes a main body 108, a Venturi assembly 110 for mixing air and fuel, a throttle valve assembly 112 for controlling flow of the air-fuel mixture, a fuel control valve assembly 114 for controlling flow of fuel into the main body 108, sensor assemblies 115, 116, and 118, and a wiring harness 120 connected to the control components of the throttle-mixing assembly 102.

With reference to FIGS. 12 to 19, the main body 108 is shown in isolation. In one aspect, the main body 108 extends between a first, intake end 108a and a second, outlet end 108b. Mounting flanges 108c, 108d are formed at the ends 108a, 108b and are shown as including through-holes for receiving fasteners to facilitate mounting of the body 108 to the airbox 18 and intake manifold 20, respectively. In one aspect, the main body 108 defines a main port 108e extending between the ends 108a, 108b and a fuel inlet port 108f extending into the main port 108e. The main body 108a is also shown as including ports 108g-108m, discussed later. The main body 108a can also be provided with a groove 108n at the outlet end 108b for receiving an O-ring type seal 121 such that a seal is formed between the main body 108 and the manifold 20. In the example shown, the main body 108 is machined from an aluminum casting. Other manufacturing methods and materials may be used.

Figure 11:
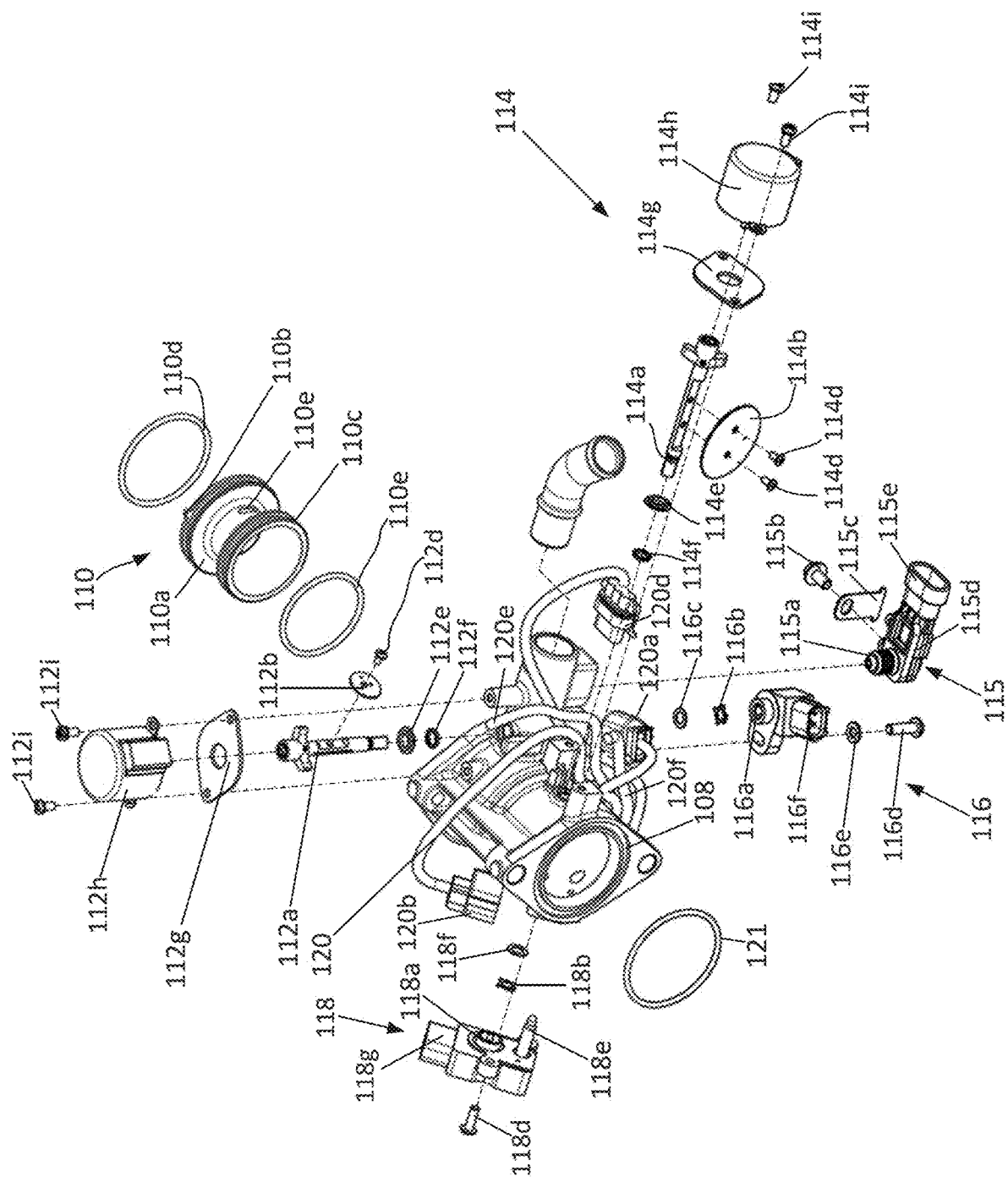
FIG. 11 is an exploded perspective view of the throttle-mixing system shown in FIG. 3.
Figure 12:
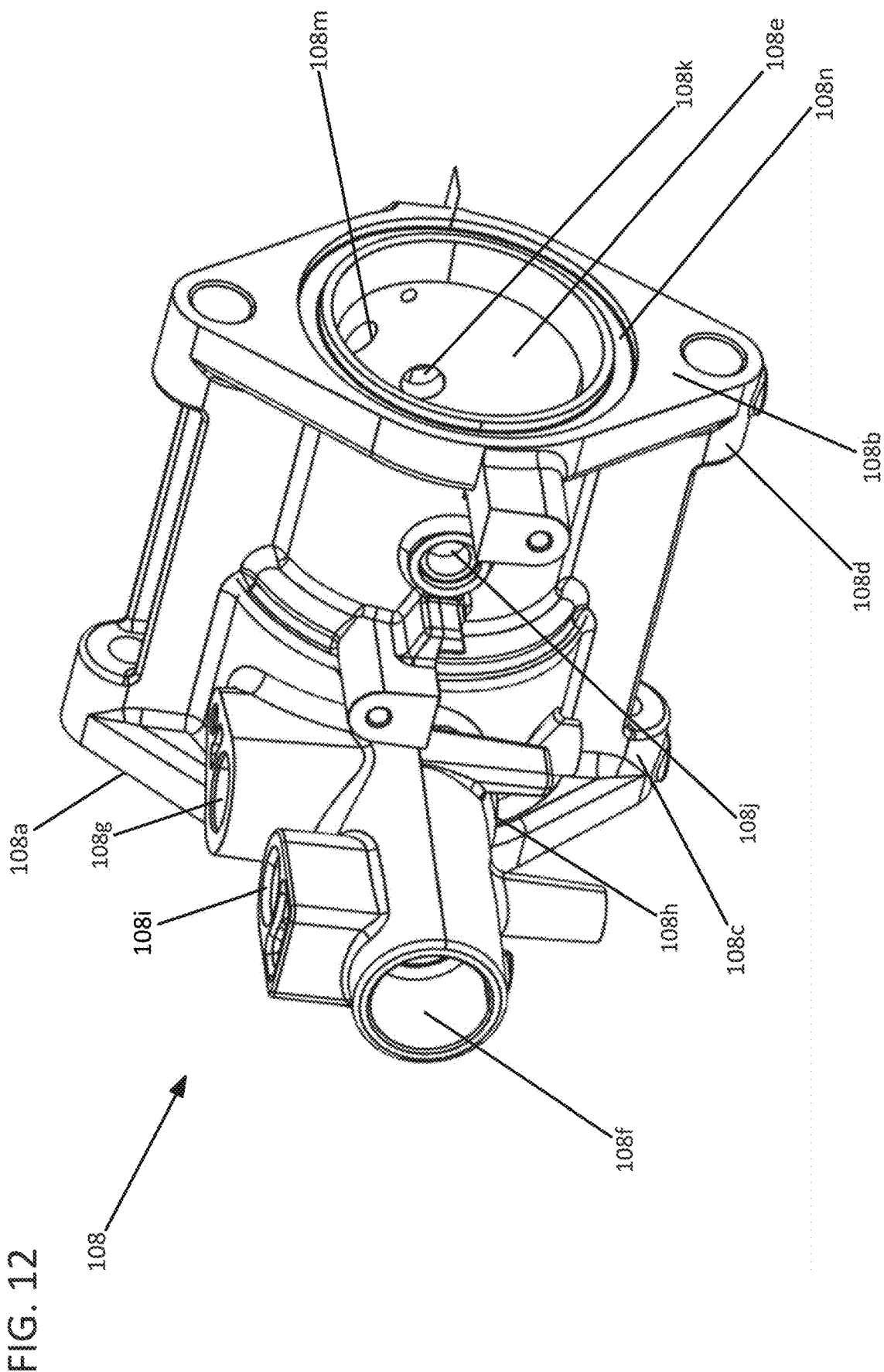
FIG. 12 is a perspective view of a main body of the throttle-mixing assembly shown in FIG. 3.
Figure 13:
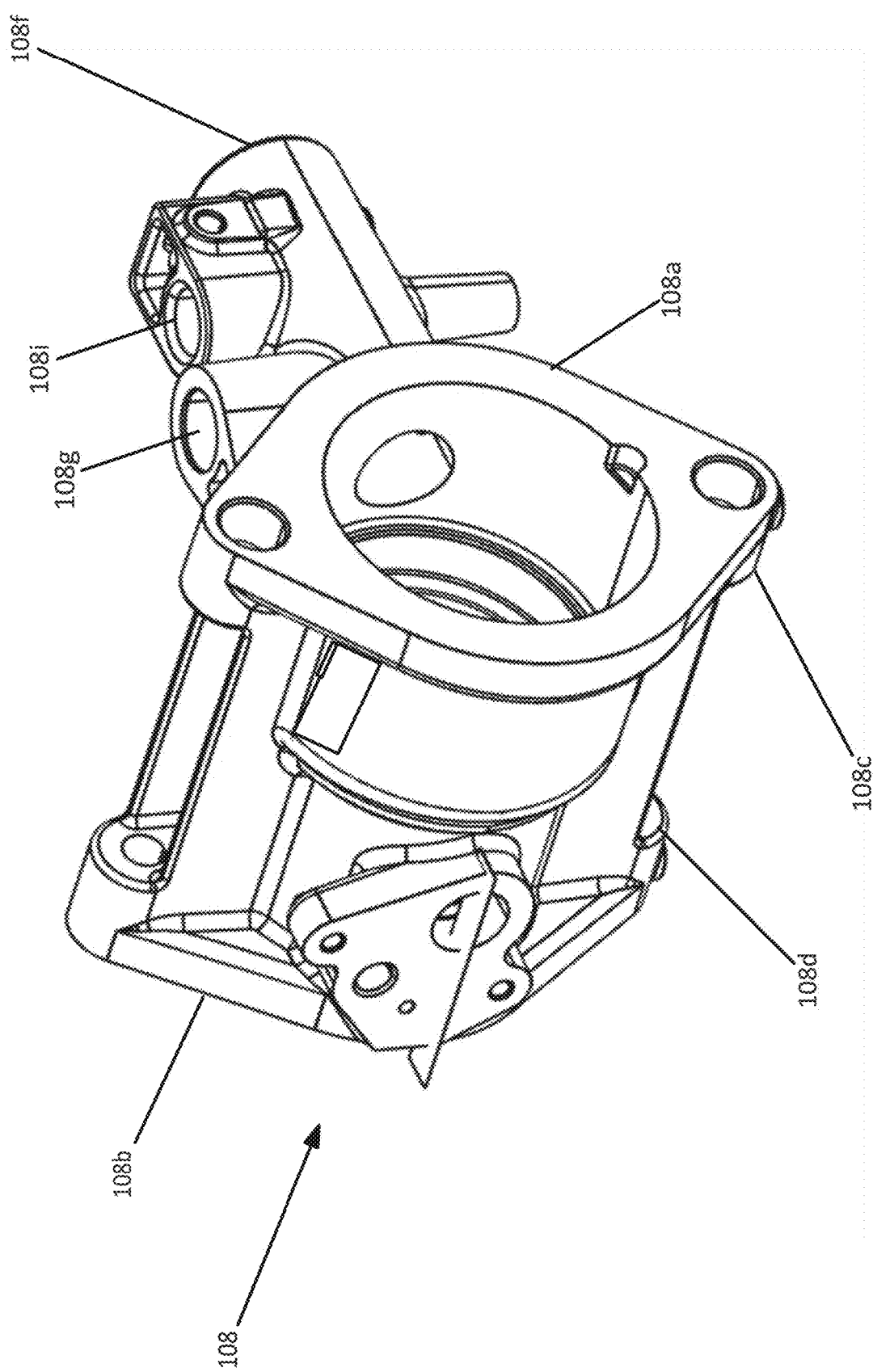
FIG. 13 is a perspective view of the main body shown in FIG. 12.
Figure 14:
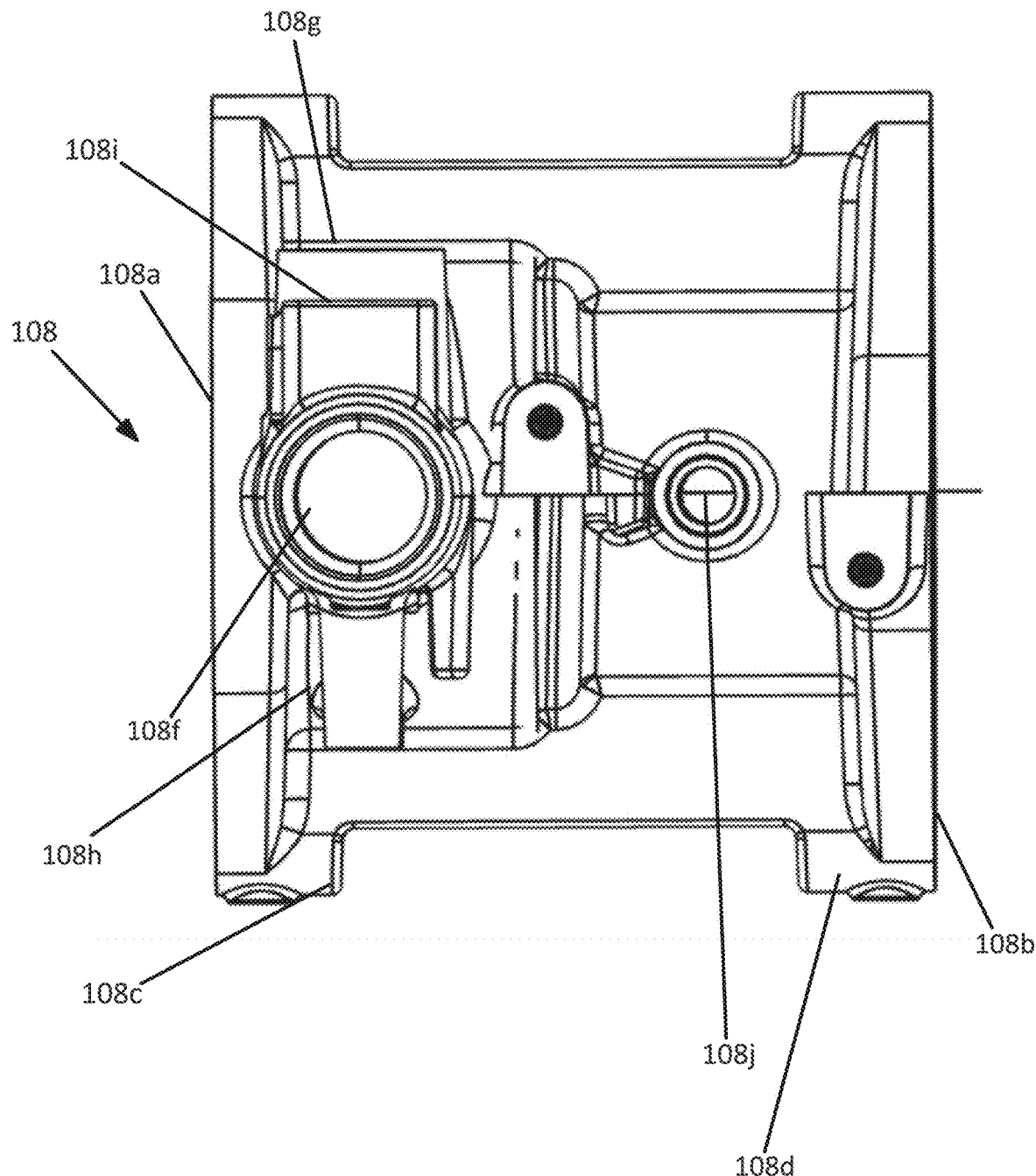
FIG. 14 is a first side view of the main body shown in FIG. 13.
Figure 15:
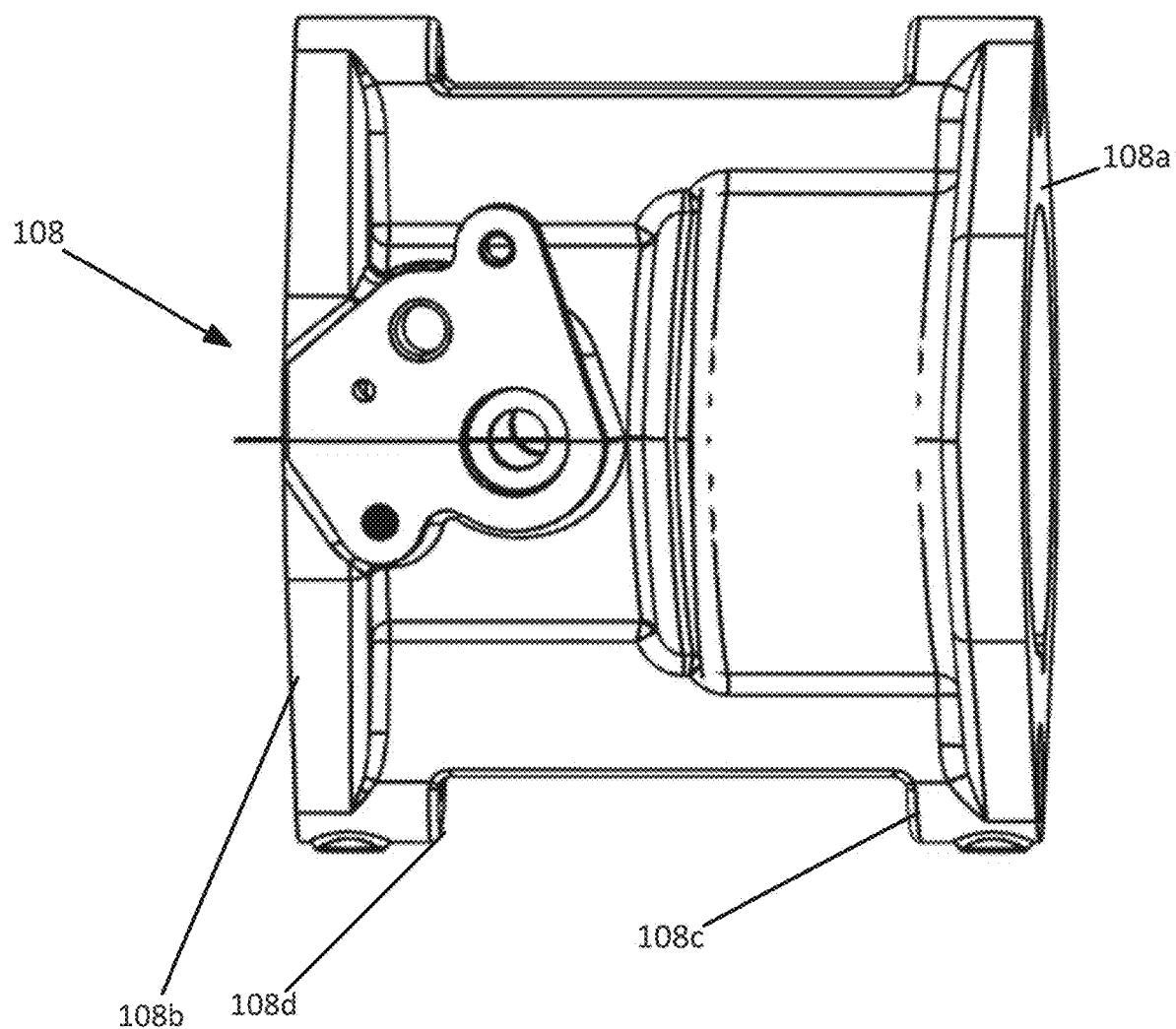
FIG. 15 is a second side view of the main body shown in FIG. 13.
Figure 16:
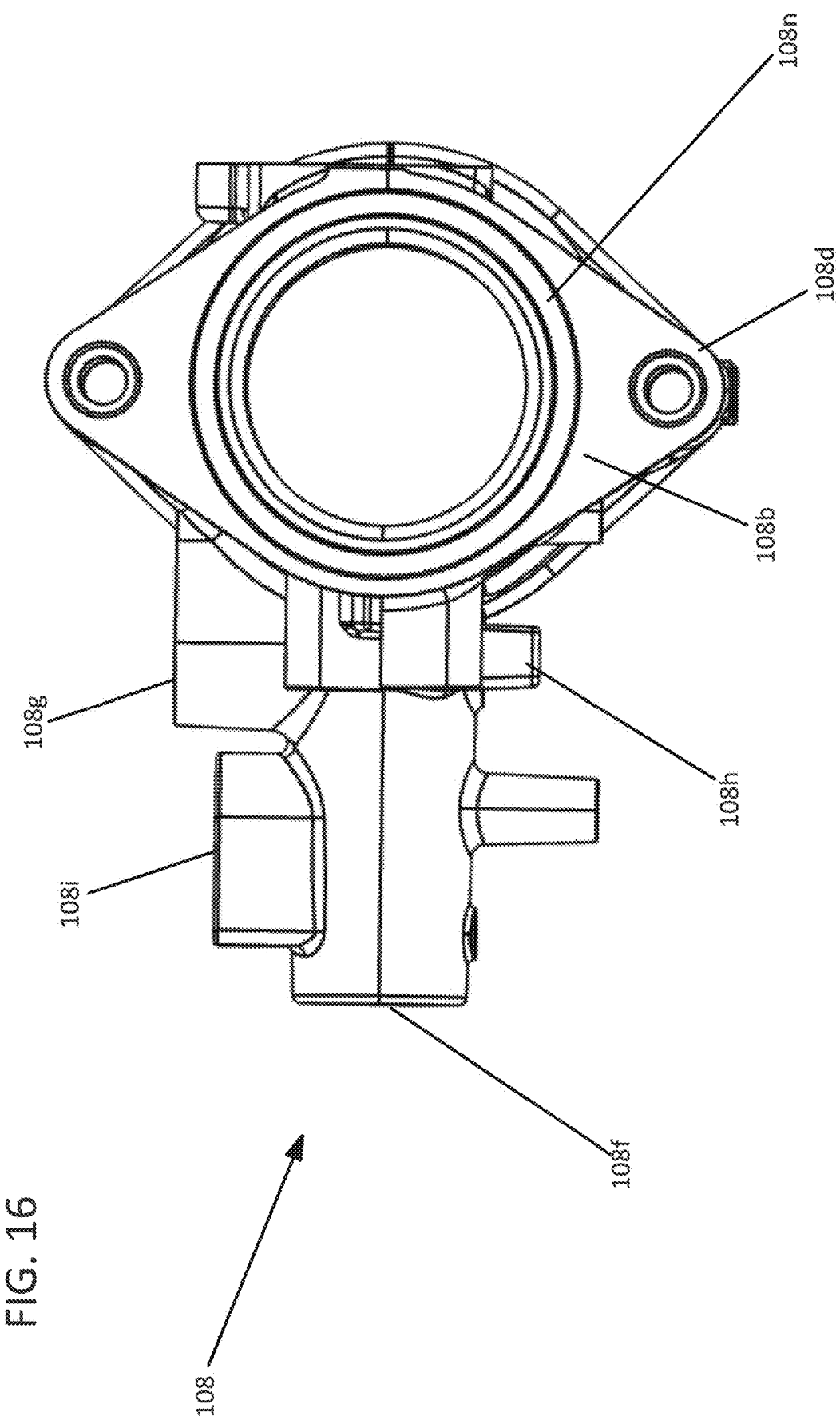
FIG. 16 is a first end view of the main body shown in FIG. 13.
Figure 17:
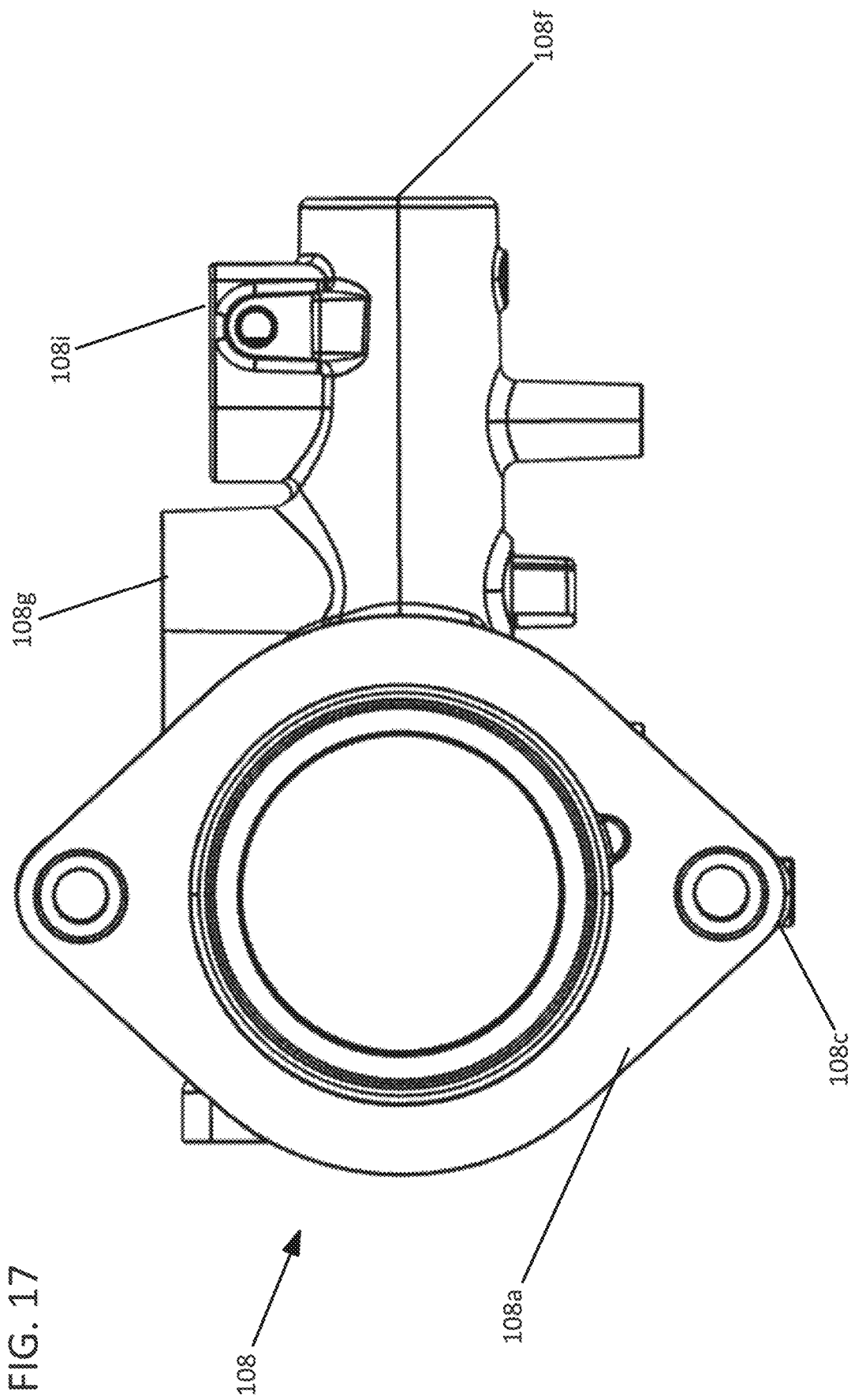
FIG. 17 is a second end view of the main body shown in FIG. 13.
Figure 18:
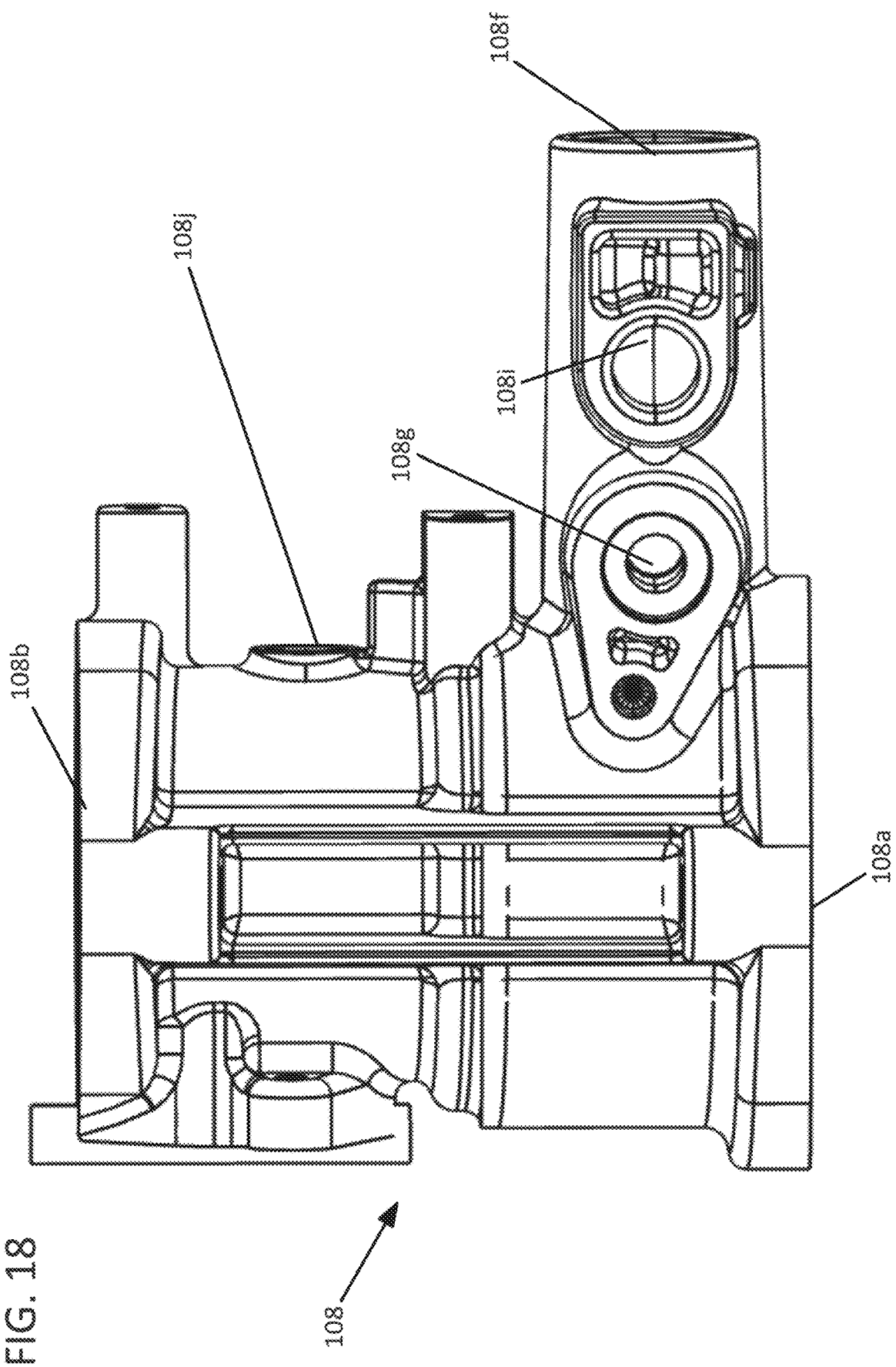
FIG. 18 is a top view of the main body shown in FIG. 13.
Figure 19:
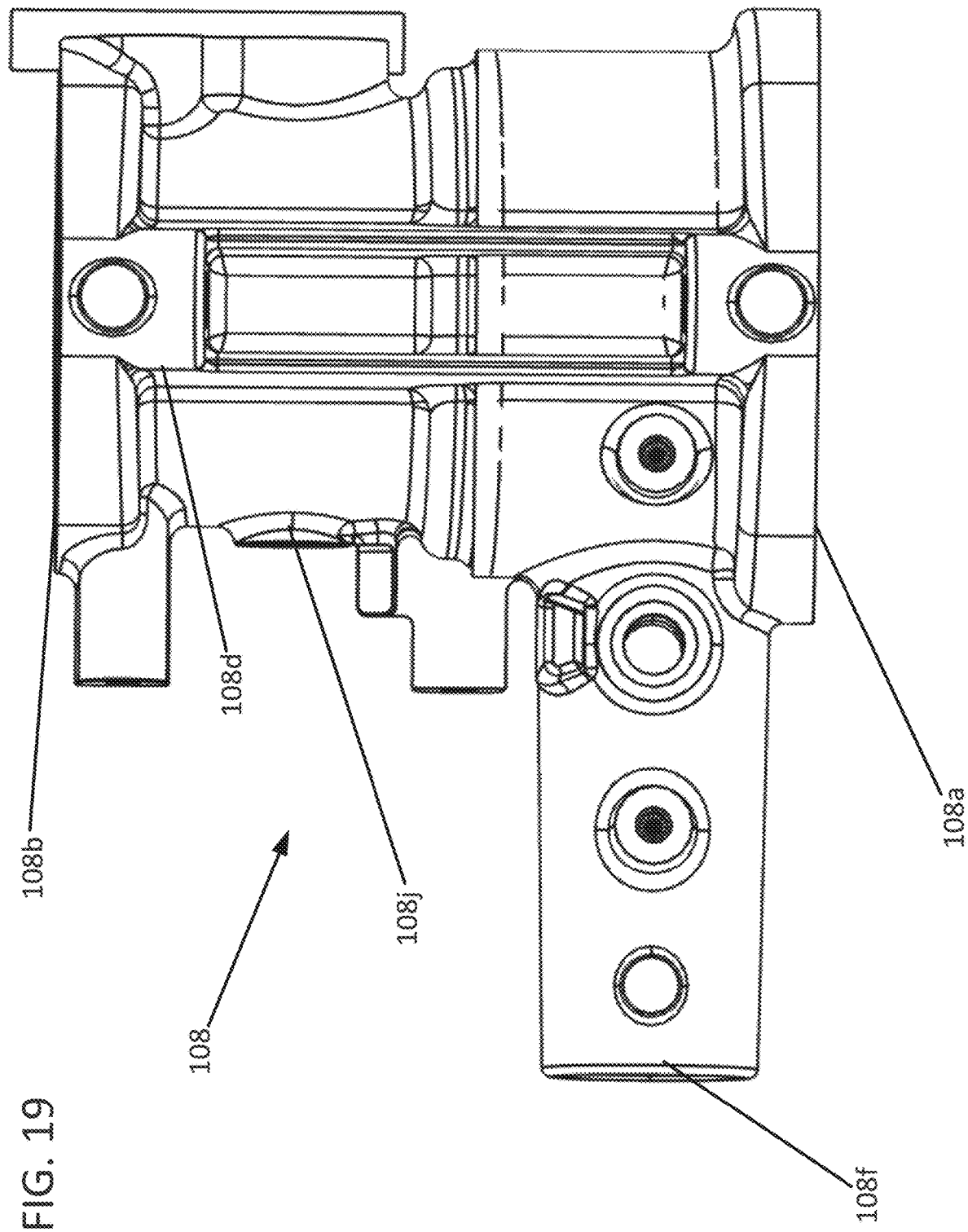
FIG. 19 is a bottom view of the main body shown in FIG. 13.
Figure 20:
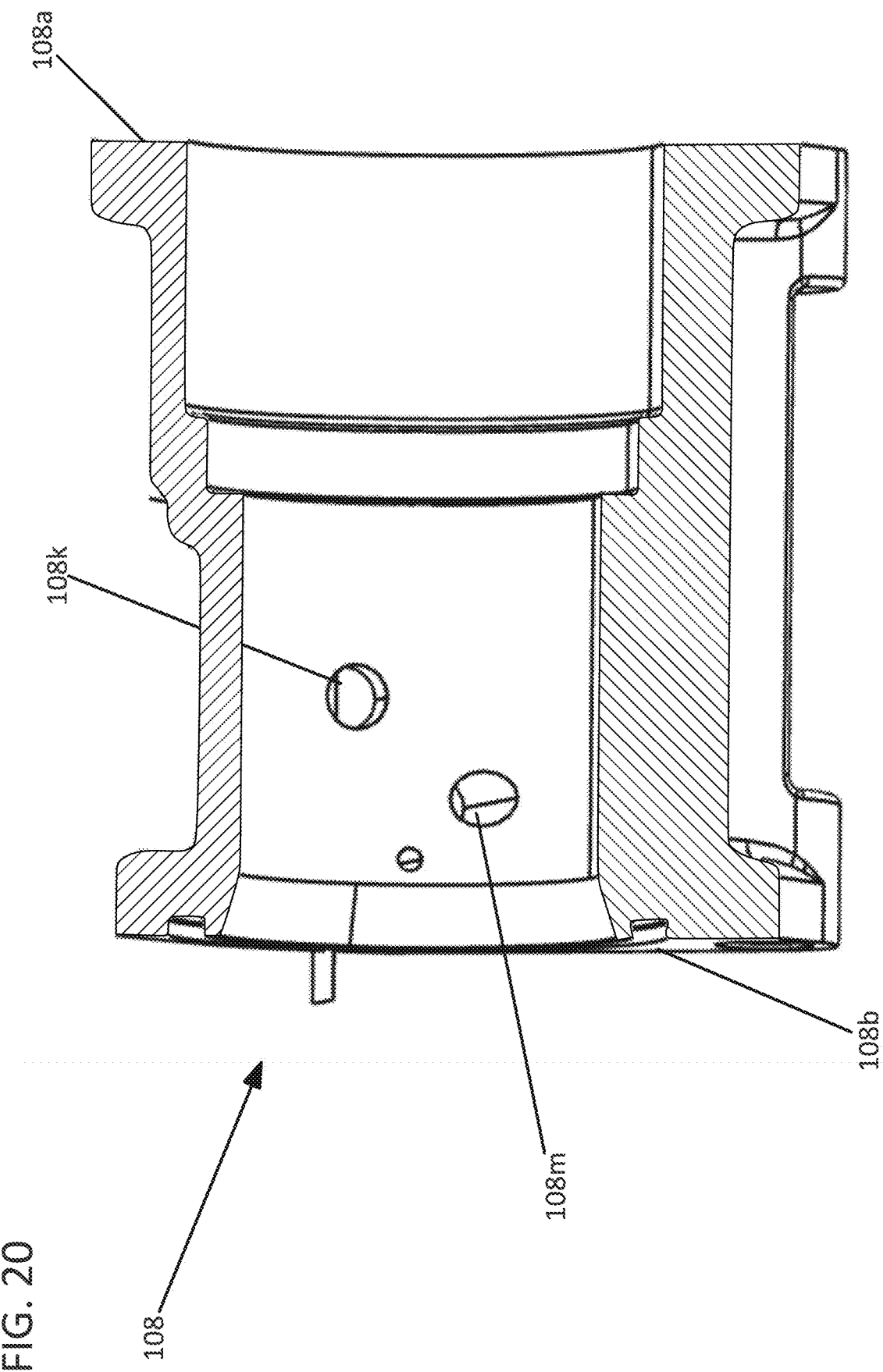
FIG. 20 is a cross-sectional view of the main body shown in FIG. 13.
Figure 21:
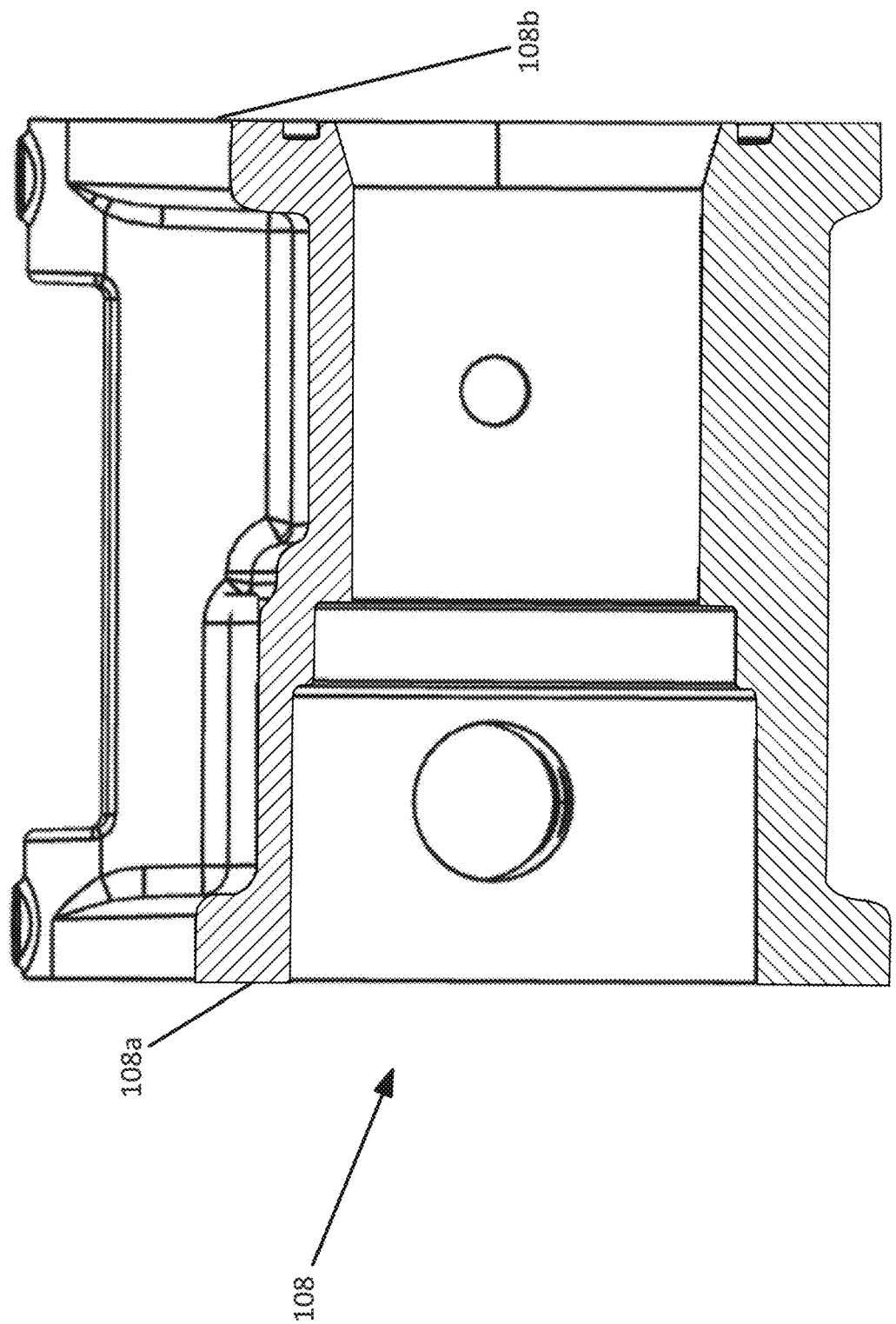
FIG. 21 is a cross-sectional view of the main body shown in FIG. 13.
Figure 22:
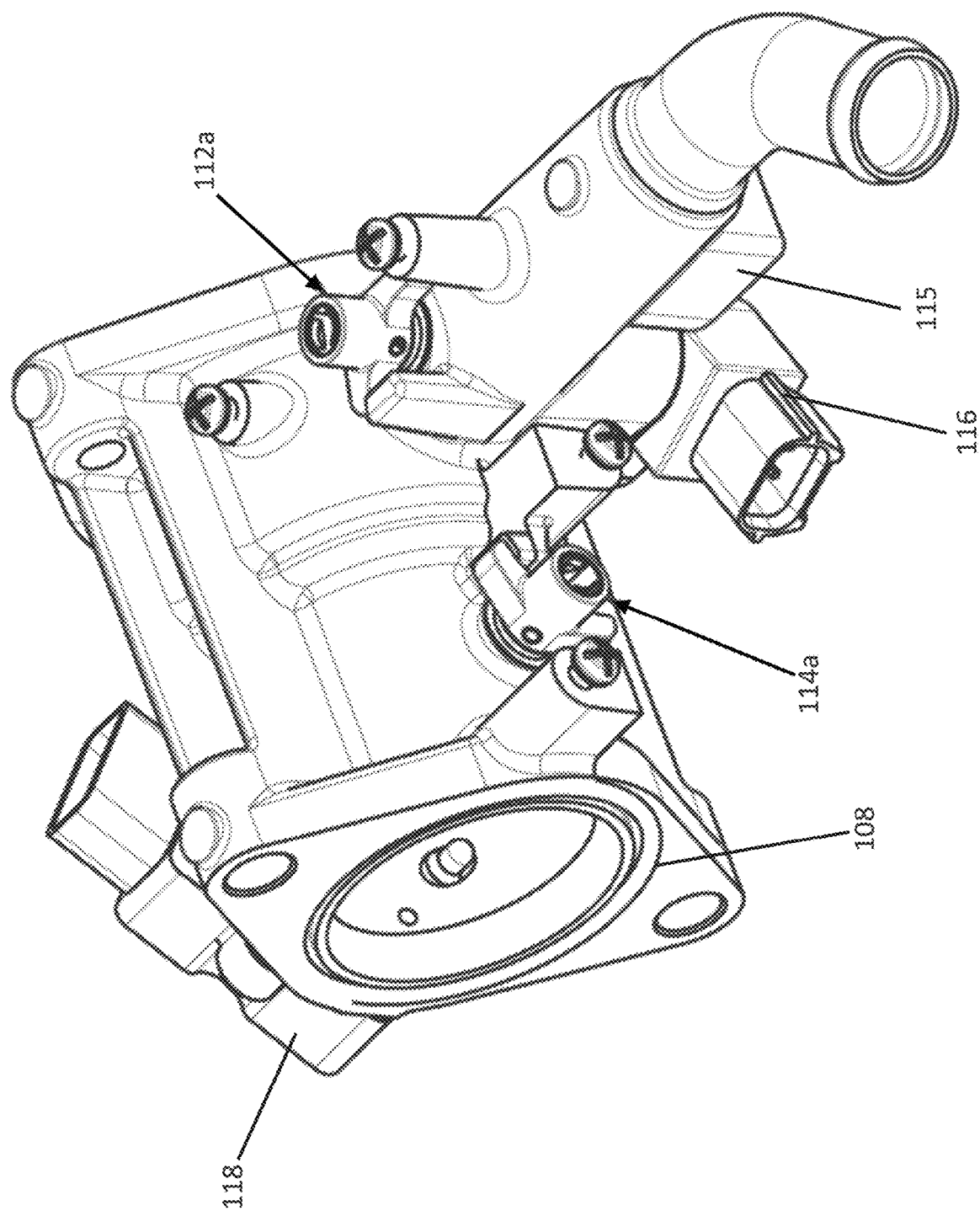
FIG. 22 is a perspective view of a portion of the throttle-mixing assembly shown in FIG. 3.
Figure 23:
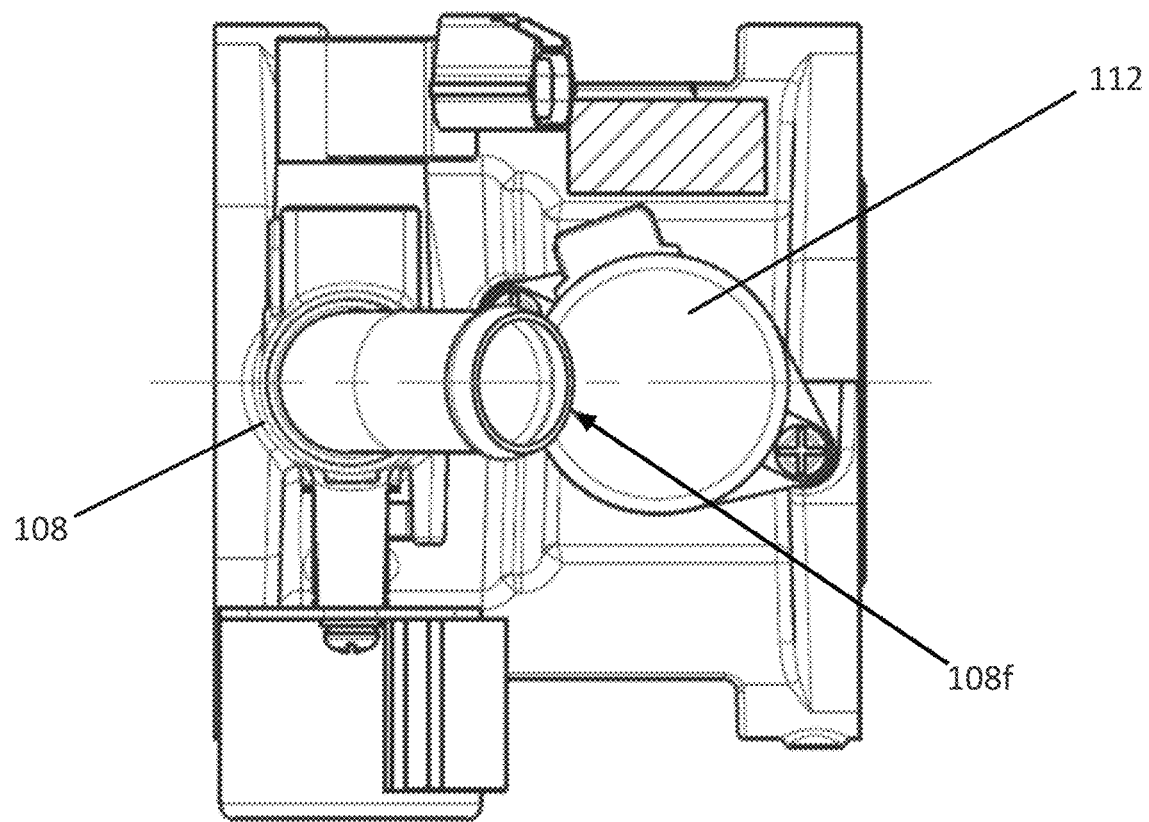
FIG. 23 is a perspective view of a portion of the throttle-mixing assembly shown in FIG. 3.

As most easily viewed at FIG. 11, the Venturi assembly 110 includes a main body 110a defining circumferential grooves 110b, 110c that receive O-rings 110c, 110d. The main body 110a defines a axial or central Venturi port 110e and further defines a lateral opening 110e extending into the port 110e. The Venturi assembly 110 is installed into the main port 108e of the main body 108 such that the opening 110e is aligned with the fuel inlet port 108f In operation, air entering the main port 198e at the inlet end is accelerated as it passes through the Venturi port 110e such that fuel from the fuel inlet port 108f is induced into the Venturi port 110e via the opening 110e, whereby the air and fuel is mixed together.

As most easily viewed at FIG. 11, the fuel control valve assembly 112 is shown as including a shaft 112a to which a throttle plate 112b is secured via a fastener 112d. The throttle plate 112b may also be characterized as being a valve, valve body, valve plate, and/or a butterfly valve. As shown, a spacer 112e, seal 112f, and mounting plate 112g are provided to enable the shaft 112a to be sealingly mounted to the main body 108 such that the shaft extends through the ports 108g, 108h and such that the throttle plate 112b is disposed within the fuel intake port 108f The fuel control valve assembly 112 is further shown as being provided with an actuator 112h that is connected to and drives the shaft 112a such that the position of the throttle plate 112b can be controlled by the actuator 112h. In the example shown, the actuator 112h is an electric motorized actuator, such as a stepper motor or a solenoid actuator, connected to the controller 500 via the wiring harness 120 via power cable or line 120e. Other type of actuators are possible. Fasteners 112i are shown as being provided to mount the motor 112h and mounting plate 112g to the main body 108 at threaded bosses in the main body 108. In operation, the actuator 112h controls the position of the throttle plate 112b to control the amount of fuel passing through the fuel inlet port 108f, and thus the composition of the air-fuel mixture within the main port 108e.

With continued reference to FIG. 11, the throttle control valve assembly 114 is shown as including a shaft 114a to which a throttle plate 114b is secured via fasteners 114d. The throttle plate 114b may be characterized as a valve, valve body, valve plate, and/or a butterfly valve. As shown, a spacer 114e, seal 114f, and mounting plate 114g are provided to enable the shaft 114a to be sealingly mounted to the main body 108 such that the shaft extends through the ports 108j, 108k and such that the throttle plate 114b is disposed within the main port 108e. The throttle control valve assembly 114 is further shown as being provided with an actuator 114h that is connected to and drives the shaft 114a such that the position of the throttle plate 114b can be controlled by the actuator 114h. In the example shown, the actuator 114h is an electric motorized actuator, such as a stepper motor, connected to the controller 200 via the wiring harness 120 at power cable or line 120f. Other type of actuators are possible. Fasteners 114i are shown as being provided to mount the motor 114h and mounting plate 114g to the main body 108 at threaded bosses in the main body 108. In operation, the actuator 114h controls the position of the throttle plate 114b and thus controls the volume of the air-fuel mixture delivered by the air-fuel delivery arrangement 100.

With continued reference to FIG. 11, the sensor assembly 115 is shown as including pressure sensor 115a. A fastener 115b and bracket 115c are also provided to secure the pressure sensor 115a to the main body 108, which is provided with a threaded boss for receiving the fastener 115b. The pressure sensor 115a is provided in a housing 115d and wired to an electrical port 115e which receives a plug 120d of the wiring harness 120 such that the controller 200 can communicate with the pressure sensor 115a via main plug 120c.

With continued reference to FIG. 11, the sensor assembly 116 is shown as including a position sensor 116a connected to the shaft 112a via a snap ring 116b and a washer 116c. A fastener 116d and washer 116e are also provided to secure the position sensor 116a to the main body 108, which is provided with a threaded boss for receiving the fastener 116d. The position sensor 116a is provided in a housing 116f and wired to an electrical port 116f which receives a plug 120a of the wiring harness 120 such that the controller 200 can communicate with the position sensor 116a via main plug 120c.

With continued reference to FIG. 11, the sensor assembly 118 is shown as including a position sensor 118a connected to the shaft 114a via a snap ring 118b and a washer 118c. A fastener 118d and washer 118f are also provided to secure the position sensor 118a to the main body 108, which is provided with a threaded boss for receiving the fastener 118d. The sensor assembly 118 can also be provided with a temperature sensor or probe 118e which extends through the port 108m and into the main port 108e. As shown, the position sensor 118a and temperature probe 118e are provided in a common housing 118f and wired to an electrical port 118g. The electrical port 118g is configured to receive a plug 120b of the wiring harness 120 such that the controller 200 can communicate with the position sensor 118a and the temperature probe 118e via main plug 120c. The sensor assembly 118 can further be provided with a pressure sensor for sensing the internal pressure of the air-fuel mixture within the main body 108. When configured in this manner, the sensor assembly 118 can be referred to as a three-in-one sensor that reads fluid temperature, fluid pressure, and throttle position.

Although the wiring harness 120 is provided with plugs 120a, 120b, 120c, 120d for removable connection to the sensor assemblies 115, 116, 118 and controller 500, and is also shown as being hard-wired to the actuators 112, 114, that other configurations are possible. For example, hard wiring connections to the sensor assemblies 115, 116, 118 may be provided and/or plugged connections to the actuators 112, 114 may be provided.

Controller 500 and Operational Modes

Figure 24:
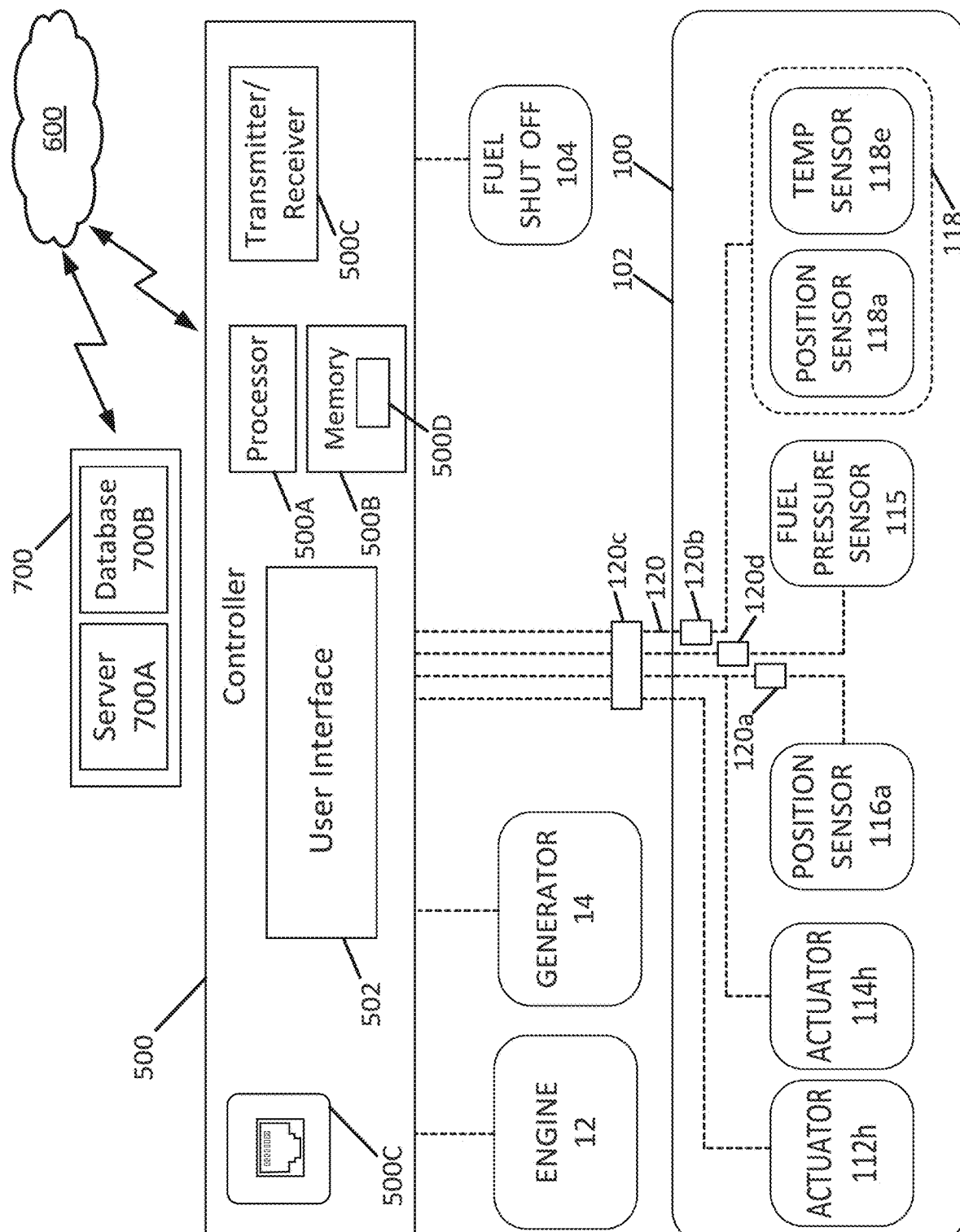
FIG. 24 is a control schematic for the throttle-mixing assembly shown in FIG. 3.

With continued reference to FIG. 24, an electronic controller 500 for the generator assembly 10 that controls the engine 12, generator 14, and the fuel delivery system 100 is schematically shown. In one aspect, the controller 500 includes a processor 500A and a non-transient storage medium or memory 500B, such as RAM, flash drive or a hard drive. Memory 500B is for storing executable code, the operating parameters, and the input from the operator user interface 502 while processor 500A is for executing the code. Memory 500B can also be for storing reference information 500D such as maps and/or lookup tables. The electronic controller is also shown as including a transmitting/receiving port 500C, such as an Ethernet port for two-way communication with a WAN/LAN related to an automation system. A user interface 502 may be provided to activate and deactivate the system, allow a user to manipulate certain settings or inputs to the controller 500, and to view information about the system operation.

The electronic controller 500 typically includes at least some form of memory 500B. Examples of memory 500B include computer readable media. Computer readable media includes any available media that can be accessed by the processor 500A. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the processor 500A.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The electronic controller 500 is also shown as having a number of inputs/outputs that may be used for operating the generator system. For example, as mentioned previously, the controller 500 can send commands to and receive feedback from the engine 12 and generator 14, as well as the fuel delivery system 100 including the throttle-mixing assembly 102 and fuel shut-off 104. Examples of inputs that could be received by the controller 500 are inputs from position, temperature, and/or pressure sensor assemblies 115, 116, 118, as schematically shown at FIG. 24. Examples of outputs that could be sent by the controller 500 are outputs to the actuators 112h, 114h, as also schematically shown at FIG. 24. The controller may be provided with additional input and/or output functions.

In general terms, the controller receives engine requirement parameters and input signals from one or more of the sensors 115a, 116a, 118a, 118f and, based on these inputs, sends output signals to the actuators 112h, 114h to control the position of the throttle plates 112b, 114b such that the air-fuel mixture composition and mass flow rate can be effectively controlled to meet the demands of the engine 12. In one example operation configuration, the controller 500 constantly monitors the fuel pressure at sensor 115, along with other engine parameters, such as the speed of the engine 12 as monitored by an engine speed sensor in direct or indirect communication with the controller 500. Based on these inputs, the controller calculates a position for each of the throttle plates 112d, 114d and sends corresponding independent outputs to the actuators 112h, 114h. The controller 500 further uses the position sensors 116a, 118a to ensure or verify that the actuators 112h, 114h have moved the throttle plates 112b, 114b to the determined positions. As the controller 500 can independently control the valve actuators 112h, 114h, the controller can tightly control the output of the engine 12 and thus the power generation at generator 14.

Throttle-Mixing Assembly 202

Figure 25:
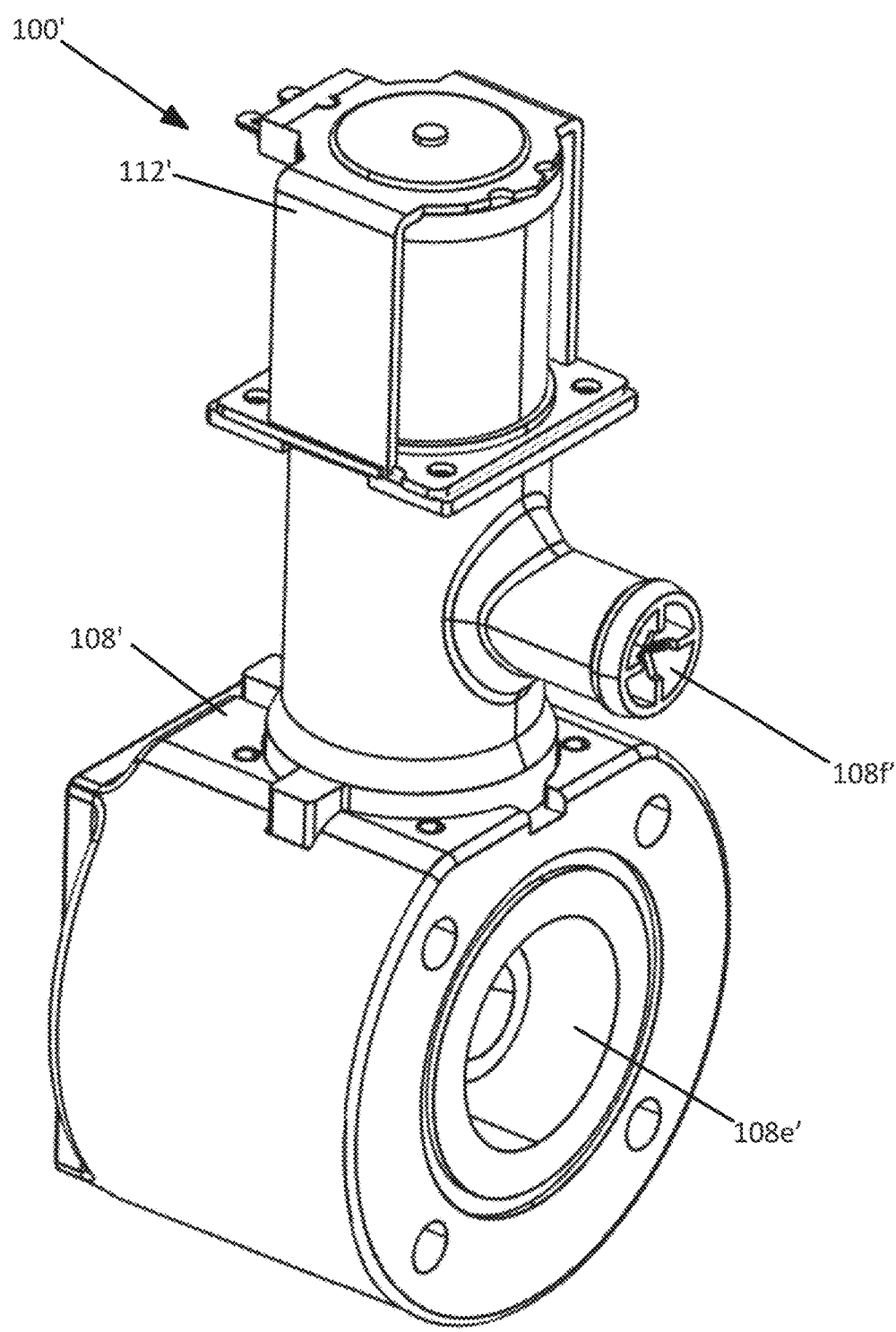
FIG. 25 is a perspective view of a second example a throttle-mixing assembly usable with the generator of FIG. 1.
Figure 26:
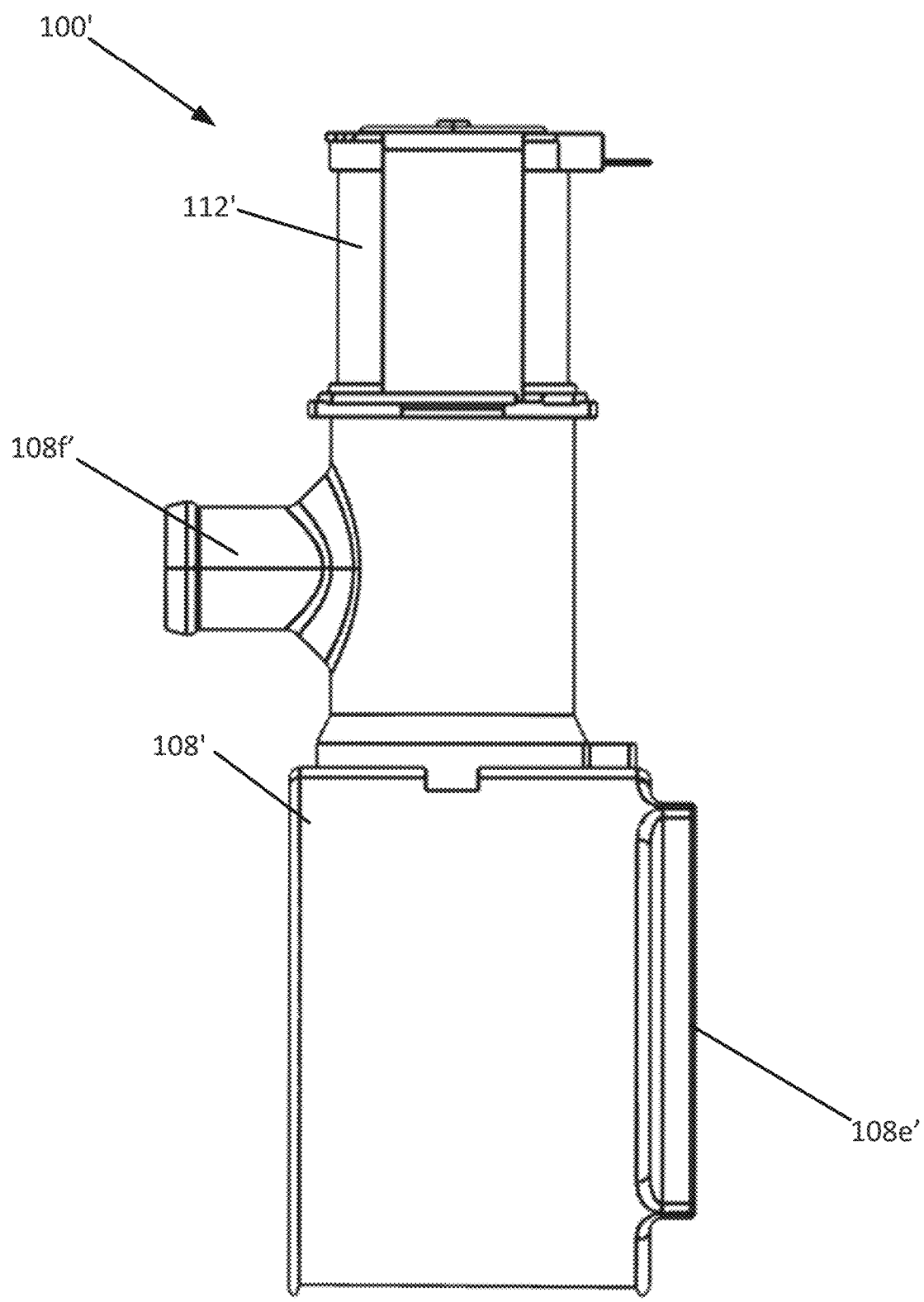
FIG. 26 is a side view of the throttle-mixing assembly shown in FIG. 25.
Figure 27:
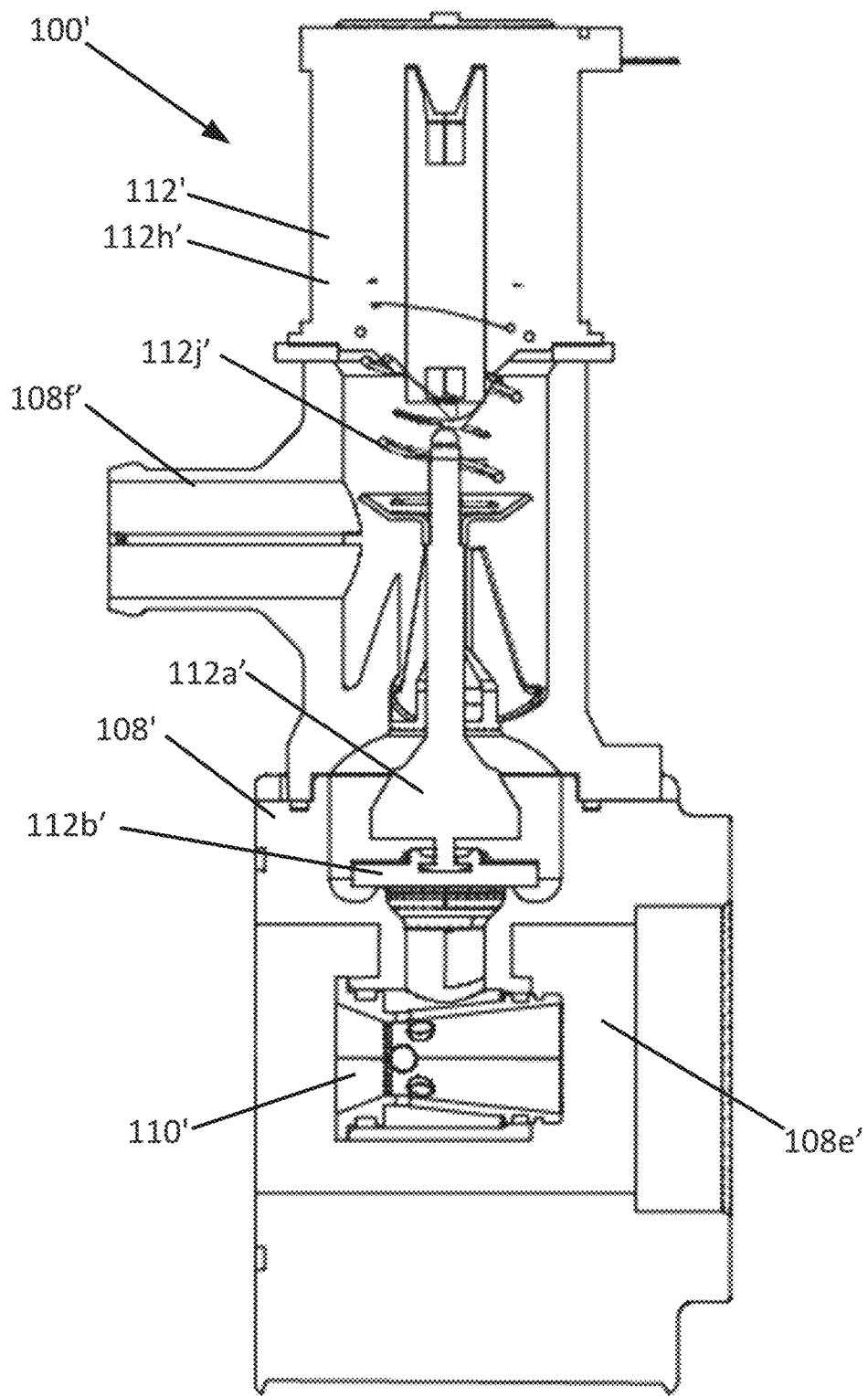
FIG. 27 is a cross-sectional side view of the throttle-mixing assembly shown in FIG. 25.

Referring to FIGS. 25 to 27, an alternative throttle-mixing assembly 100' is presented to illustrate that alternative configurations may be provided without departing from the concepts presented herein. In contrast to the previous embodiment the assembly 100' is provided with an actuator 112', such as a solenoid, which has a linear action such that the shaft 112*a*' is moved axially when the actuator 112' is activated. In one aspect, the assembly 100' may therefore be characterized as including a linearly controlled pintle valve. The assembly 100' is further provided with a biasing spring acting on the shaft assembly 112*a*' such that the plate 112*b*' is held in a closed or seated position to shut off fuel flow through passageway 108*f* when the actuator 112' is deactivated. Accordingly, the disclosed arrangement provides a safety function by cutting off fuel flow in the event control power is lost. Once activated, the actuator 112' functions to pull or lift the shaft in an axial direction away from the valve seat such that fuel can flow to the Venturi assembly 110'. The actuator 112' can be modulating such that the position of the plate 112'*b* can be tightly controlled by the controller 500. Although this embodiment does not show a throttle assembly for controlling the flow of the air-fuel mixture, the construction associated with the previous embodiment may be provided in conjunction with the structure shown at FIGS. 25 to 27. Further, the sensors and wiring harness of the previous embodiment may be incorporated into the embodiment shown at FIGS. 25 and 27 as well. It is further noted that the throttle valve assembly 112, Venturi assembly 110, and/or associated portions of the main body 108 associated with assembly 100 of the previous embodiment may be replaced by the throttle valve assembly 112', Venturi assembly 110', and portions of the main body 108' depicted at FIGS. 25 to 27. The throttle-mixing assembly 100' may be controlled by the above-described electronic controller 500.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

We claim:

1. A fuel delivery arrangement for a generator, the fuel delivery arrangement comprising:
    a throttle-mixing assembly including:
        a mixer body defining a main port extending between an air inlet end and a mixed air-fuel outlet end and defining a fuel inlet port extending into the main port; and
        a Venturi structure located within and sealed against the main port at a first sealed location and a second sealed location, the Venturi structure defining a fuel opening between the first and second sealed locations, the Venturi structure being configured to mix fuel received from the fuel inlet port, via the fuel opening, with air received from the air inlet end and to deliver an air-fuel mixture to an air-fuel outlet port;
    a fuel control valve assembly, mounted to the mixer body, including a first valve and a first actuator arranged to control a flow of the fuel passing through the fuel inlet port; and
    a throttle control valve assembly, mounted to the mixer body, including a second valve and a second actuator arranged to control a flow of the air-fuel mixture passing through the main port;
    wherein the first valve is a throttle plate located within the fuel inlet port.

2. The fuel delivery arrangement of claim 1, wherein the second valve is a throttle plate located within the main port downstream of the Venturi structure.

3. The fuel delivery arrangement of claim 1, wherein the first actuator and the second actuator are electric motorized actuators.

4. The fuel delivery arrangement of claim 1, further including an electrical wiring harness, mounted to the mixer body, the electrical wiring harness being in electrical connection with the first actuator and the second actuator.

5. The fuel delivery arrangement of claim 1, further comprising one or more of:
    a first pressure sensor for sensing fuel pressure proximate the fuel inlet port;
    a second pressure sensor for sensing air-fuel mixture pressure;
    a temperature sensor proximate the air-fuel outlet port;
    a first position sensor for sensing a position of the first valve; and
    a second position sensor for sensing a position of the second valve.

6. The fuel delivery arrangement of claim 5, further including an electrical wiring harness, mounted to the mixer body, the electrical wiring harness being in electrical connection with the first actuator and the second actuator and in electrical connection with the one or more of the first pressure sensor, second pressure sensor, temperature sensor, first position sensor, and second position sensor.

7. The fuel delivery arrangement of claim 5, wherein the second pressure sensor, temperature sensor, and second position sensor are provided in a common housing.

8. The fuel delivery arrangement of claim 5, wherein the temperature sensor includes a probe extending into the main port.

9. The fuel delivery arrangement of claim 1, further comprising one or both of a first and second position sensor, the first position sensor for sensing a position of the first valve, the first position sensor being mounted to the mixer body on a side opposite the first actuator, the second position sensor for sensing a position of the second valve, the second position sensor being mounted to the mixer body on a side opposite the second actuator.

10. The fuel delivery arrangement of claim 9, wherein the first valve includes a first valve member and a first shaft, wherein the first actuator is connected to a first end of the first shaft and the first position sensor is connected to a second end of the first shaft, wherein the second valve includes a second valve member and a second shaft, wherein the second actuator is connected to a first end of the second shaft and the second position sensor is connected to a second end of the second shaft.

11. A generator assembly comprising:
    an internal combustion engine;
    an electric generator coupled to and driven by the engine;
    a fuel delivery arrangement for delivering an air-fuel mixture to the internal combustion engine, the fuel delivery arrangement comprising:
        a throttle-mixing assembly including:
            a mixer body defining a main port extending between an air inlet end and a mixed air-fuel outlet end and defining a fuel inlet port extending into the main port; and
            a Venturi structure located within the main port and being configured to mix fuel received from the fuel inlet port with air received from the air inlet end and to deliver an air-fuel mixture to an air-fuel outlet port;
        a fuel control valve assembly, mounted to the mixer body, including a first valve and a first actuator arranged to control a gaseous flow of the fuel passing through the fuel inlet port; and a throttle control valve assembly, mounted to the mixer body, including a second valve and a second actuator arranged to control a flow of the air-fuel mixture passing through the main port; and each of:
a first pressure sensor for sensing fuel pressure proximate the fuel inlet port;
a second pressure sensor for sensing air-fuel mixture pressure;
a temperature sensor proximate the air-fuel outlet port;
a first position sensor for sensing a position of the first valve; and
a second position sensor for sensing a position of the second valve.

12. The generator assembly of claim 11, wherein the first valve is a throttle plate located within the fuel inlet port.

13. The generator assembly of claim 11, wherein the second valve is a throttle plate located within the main port downstream of the Venturi structure.

14. The generator assembly of claim 11, wherein the first actuator and the second actuator are electric motorized actuators.

15. The generator assembly of claim 12, further including an electrical wiring harness, mounted to the mixer body, the electrical wiring harness being in electrical connection with the first actuator and the second actuator.

16. The generator assembly of claim 11, further including an electrical wiring harness, mounted to the mixer body, the electrical wiring harness being in electrical connection with the first actuator and the second actuator and in electrical connection with the first pressure sensor, second pressure sensor, temperature sensor, first position sensor, and second position sensor.

17. The generator assembly of claim 11, wherein the second pressure sensor, temperature sensor, and second position sensor are provided in a common housing.

18. The generator assembly of claim 11, wherein the temperature sensor includes a probe extending into the main port.

19. A fuel delivery arrangement for a generator, the fuel delivery arrangement comprising:
a throttle-mixing assembly including:
a mixer body defining a main port extending between an air inlet end and a mixed air-fuel outlet end and defining a fuel inlet port extending into the main port; and
a Venturi structure located within the main port and being configured to mix fuel received from the fuel inlet port with air received from the air inlet end and to deliver an air-fuel mixture to an air-fuel outlet port;
a fuel control valve assembly, mounted to the mixer body, including a first valve and a first actuator arranged to control a gaseous flow of the fuel passing through the fuel inlet port;
a throttle control valve assembly, mounted to the mixer body, including a second valve and a second actuator arranged to control a flow of the air-fuel mixture passing through the main port; and
each of:
a first pressure sensor for sensing fuel pressure proximate the fuel inlet port;
a second pressure sensor for sensing air-fuel mixture pressure;
a temperature sensor proximate the air-fuel outlet port;
a first position sensor for sensing a position of the first valve; and
a second position sensor for sensing a position of the second valve.

* * * * *